United States Patent [19]

Suzuki et al.

[11] Patent Number: 5,665,478
[45] Date of Patent: Sep. 9, 1997

[54] MAGNETIC RECORDING MEDIA FOR LONGITUDINAL RECORDING

[75] Inventors: Hiroyuki Suzuki, Kawasaki; Yoshihiro Shiroishi, Hachioji; Sadao Hishiyama, Sayama; Tomoyuki Ohno, Kokubunji; Yotsuo Yahisa, Fuchu; Yoshibumi Matsuda, Kokubunji; Norikazu Tsumita, Kanagawa-ken; Masaki Ohura, Odawara; Takaaki Shirakura, Chigasaki; Noriyuki Shige, Odawara; Kazumasa Takagi, Tokyo, all of Japan

[73] Assignee: Hitachi, Ltd., Tokyo, Japan

[21] Appl. No.: 328,400

[22] Filed: Oct. 24, 1994

Related U.S. Application Data

[60] Continuation of Ser. No. 844,528, Mar. 2, 1992, abandoned, which is a division of Ser. No. 391,181, Aug. 8, 1989, Pat. No. 5,143,794.

[30] Foreign Application Priority Data

| Aug. 10, 1988 | [JP] | Japan | 63-197919 |
| Aug. 24, 1988 | [JP] | Japan | 63-208317 |
| Mar. 6, 1989 | [JP] | Japan | 1-051889 |

[51] Int. Cl.⁶ ............................................. H01F 1/00
[52] U.S. Cl. ........................... 428/611; 428/668; 428/928
[58] Field of Search ........................ 428/611, 635, 428/668, 928, 680, 65.3, 692; 148/313; 360/131, 133, 135

[56] References Cited

U.S. PATENT DOCUMENTS

| 4,193,098 | 3/1980 | Bixby et al. | 360/10 |
| 4,578,728 | 3/1986 | Sakakima et al. | 360/125 |
| 4,622,271 | 11/1986 | Arai et al. | 428/615 |
| 4,654,276 | 3/1987 | Albert et al. | 428/641 |
| 4,748,089 | 5/1988 | Kumasaka et al. | 428/635 |
| 4,950,548 | 8/1990 | Furusawa et al. | 428/611 |
| 5,023,148 | 6/1991 | Fisher et al. | 428/694 |
| 5,034,286 | 7/1991 | Nasu et al. | 428/694 |

*Primary Examiner*—David A. Simmons
*Assistant Examiner*—Linda L. Gray
*Attorney, Agent, or Firm*—Fay, Sharpe, Beall, Fagan, Minnich & McKee

[57] ABSTRACT

A magnetic recording medium for longitudinal recording with a low media noise, a high S/N ratio and high reliabilities in corrosion resistance is disclosed. By making a magnetic layer from a Co-based alloy comprising 1 to 35 at. % of at least one element selected from the group consisting of Pt and Ir, 1 to 17 at. % of at least one element selected from the group consisting of Ti, Zr, Hf, V, Nb, Ta, Cr, Mo, W, Ge and Si, except for Si, whose concentration is 1 to 40 at. %, and 0.1 to 10 at. % of oxygen, a magnetic recording medium for longitudinal recording having an inplane coercivity of 1,200 Oe or more and a coercive squares of not more than 0.85 is obtained.

44 Claims, 11 Drawing Sheets

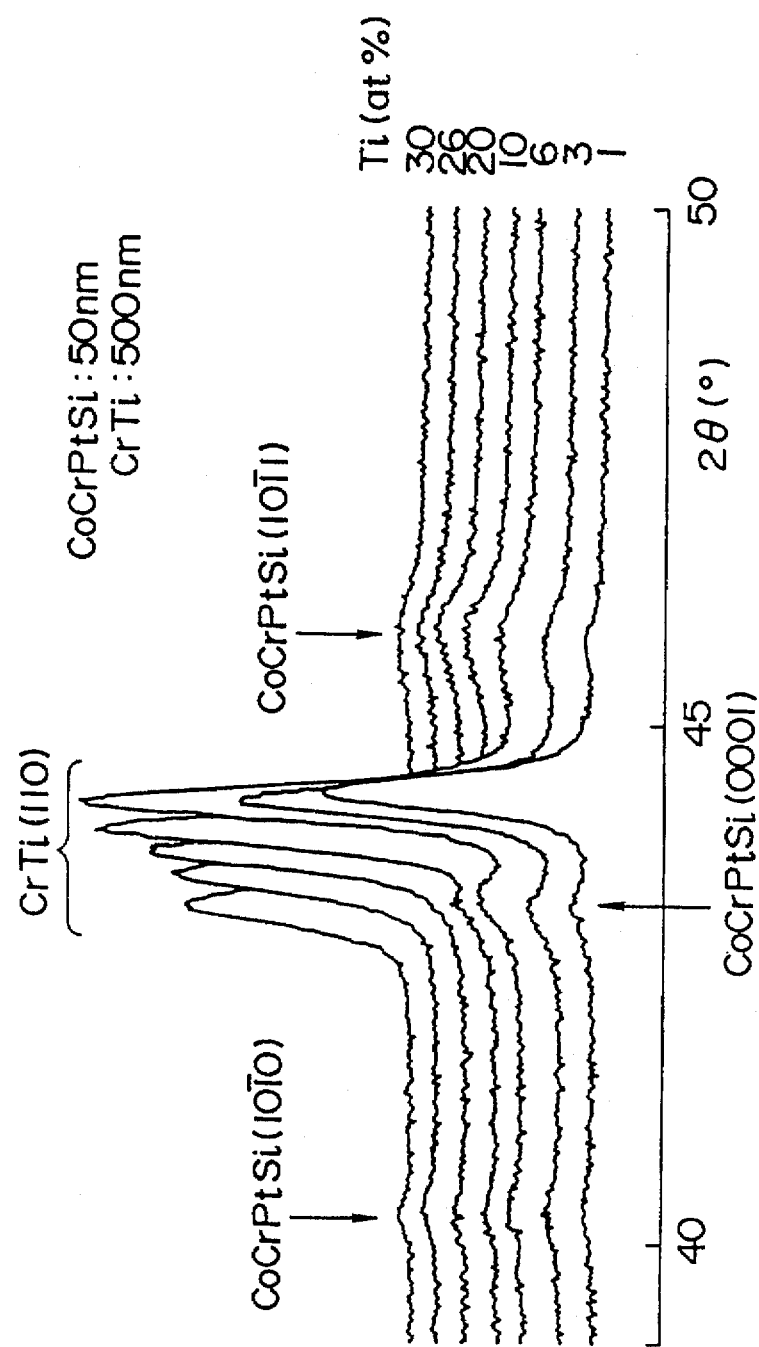

MAGNETIC RECORDING MEDIA FOR LONGITUDINAL RECORDING

This is a continuation of Ser. No. 07/844,528 filed on Mar. 2, 1992, now abandoned, which is a divisional of U.S. Ser. No. 07/391,181 filed on Aug. 8, 1989, now U.S. Pat. No. 5,143,794.

BACKGROUND OF THE INVENTION

This invention relates to magnetic recording media such as magnetic recording tapes, floppy disks, magnetic recording disks, etc., a process for producing the same, and magnetic memory apparatuses using the magnetic recording media, and more particularly to magnetic recording media for longitudinal recording suitable for high density magnetic recording, a process for producing the same and magnetic memory apparatuses.

Heretofore, magnetic recording media using a metallic magnetic film have been proposed as magnetic recording media for longitudinal recording for high density magnetic recording, as disclosed in Japanese Patent Publication No. 54-33523. Processes for forming magnetic recording media for longitudinal recording include an evaporation process, a sputtering process, a plating process, an ion beam sputtering process, etc.

Recently, needs for higher density recording and higher reliability have been increased. For example, magnetic recording media for longitudinal recording with a thin metallic magnetic film having an inplane coercivity as high as about 700 Oe and a high corrosion resistance at a high temperature and a high humidity, such as thin metallic magnetic film of magnetic alloy, e.g. Co—Pt, Co—Cr—Pt, Co—Ta—Pt, Co—Si—Pt, Co—Zr—Pt, Co—Hf—Pt, etc. have been proposed as in Japanese Patent Applications Kokai (Laid-open) Nos. 60-111323, 59-177725, 59-8806, etc.

Furthermore, it has been proposed to improve static magnetic properties such as an inplane coercivity Hc, a squareness S, a coercive squareness S*, etc. For example, it has been proposed to form a pure metal layer of Cr, Mo, W, Nh, W, etc. or an alloy layer of Cr—V, Cr—Fe, etc. as an underlayer on a substrate and form a magnetic recording layer of Co—Pt alloy or Co—Cr—Pt alloy thereon, an disclosed in Japanese Patent Application Kokai (Laid-open) No. 62-257617 (=U.S. Pat. No. 4,654,276), or to form a magnetic recording layer of Co—Cr—Pt alloy on a Ni—P underlayer, as disclosed in Japanese Patent Application Kokai (Laid-open) No. 59-88806, or to form an alumite underlayer on a substrate of aluminum alloy and form a magnetic recording layer of cobalt (Co)-based alloy comprising 3 to 15 at. % of at least Mo, V and W, 3 to 20 at. % of Cr and 3 to 15 at. % of a noble metal element such as Pt, Rh, Ru, Re, Pd, Ir, etc., the balance being at least 75 at. % of Co, thereon, as disclosed in Japanese Patent Applications Kokai (Laid-open) Nos. 61-246917 and 61-253622.

Furthermore, Japanese Patent Application Kokai (Laid-open) No. 62-257617 (=U.S. Pat. No. 4,654,276) and Japanese Patent Application Kokai (Laid-open) No. 62-257618 (=U.S. Pat. No. 4,652,499) disclose that when a magnetic recording layer of Co—Pt or Co—Cr—Pt is produced on a non-magnetic underlayer having a thickness of about 50 nm, such as Cr—V underlayer or W underlayer, the inplane coercivity Hc can be made higher than 1,200 Oe and also the coercive squareness S* higher than 0.9.

SUMMARY OF THE INVENTION

The main object of the present invention is to improve the corrosion resistance of a metallic magnetic layer and also to increase the inplane coercitvity and the coercive squareness, thereby obtaining a higher density magnetic recording and a higher read output. Magnetic recording media of the prior art generally have such a disadvantage that the media noise tends to increase with a higher density magnetic recording and a higher read output. Particularly with a recent higher density magnetic recording, the recording frequency has been increased and the band width has been broadened, and consequently the head noise and amplifier noise tend to increase. Thus, it has been desired to develop magnetic recording media having smaller noise characteristics than these noises, while maintaining a higher read output.

As the result of extensive studies, the present inventors have found that an increase in the inplane coercivity and coercive squareness can increase the read and write characteristics at a higher density, but also can increase the noise and thus is not always advantageous with respect to the signal-to-noise ratio, and that particularly the noise considerably increases when the coercive squareness is made more than 0.9. Thus, in order to obtain magnetic recording media for longitudinal recording with distinguished read and write characteristics, it is essential to satisfy these mutually contradicting magnetic properties at the same time, and it is a current task to satisfy an inplane coercivity Hc of not less than 1,200 Oe and a coercive squareness S* of not more than 0.9, preferably not more than 0.85 at the same time. A coercive squareness S* means a ratio of H to Hc (H/Hc) at a cross point of a tangent line drawn at the point of inplane coercivity Hc in a magnetic hysteresis loop with a straight line drawn at the point of remanence magnetization Mr and in parallel to the magnetic field (H) axis.

A first object of the present invention is to provide magnetic recording media for longitudinal recording with less noises, a distinguished S/N ratio and a high reliability in corrosion resistance, etc.

A second object of the present invention is to provide magnetic recording media for longitudinal recording with a high inplane coercivity Hc, that is, at least 1,200 Oe and a small coercive squareness S*, that is, not more than 0.9, preferably not more than 0.85, which can read and write in a high S/N ratio even at a high density recording and has a high reliability, that is, high corrosion resistance and anti-wear properties.

A third object of the present invention is to provide a process for producing magnetic recording media for longitudinal recording that can attain the second object of the present invention.

A fourth object of the present invention is to provide magnetic memory apparatuses using the magnetic recording media for longitudinal recording that can attain the first or second object or.both objects of the present invention.

The first object of the present invention can be attained by making a magnetic layer mainly from an alloy comprising Co, a material X composed of at least one element selected from the first group consisting of Cr, Mo and W, a material Y' composed of at least one element selected from the second group consisting of Ti, Zr, Hf, Ta, Nb, Ru and Rh, and a material Z composed of at least one element selected from the third group consisting of Al and Si. The alloy of the magnetic layer is represented by the following general formula:

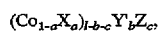

$(Co_{1-a}X_a)_{1-b-c}Y'_bZ_c,$ wherein it is desirable that a concentration of X on the basis of Co, that is, 100a, is 3 at. % to 20 at. % and concentrations of Y' and Z on the basis of the sum total of Co and X, that is, 100b and 100c, are 1 at. %. to 15 at. % and 1 at. % to 15 at. %, respectively, where the concentration of inevitable impurities is disregarded. Furthermore, it is desirable that the magnetic layer contains 0.1 at. % to 15 at. % of oxygen.

Furthermore, it is particularly desirable with respect to an improvement of inplane coercivity to provide an intermediate layer of nonmagnetic material composed mainly of at least one of Cr, Mo and W, and their alloys such as Cr—Ti, etc. between the magnetic layer and the nonmagnetic substrate. With magnetic recording media of the foregoing structure, magnetic memory apparatuses of high capacity with a high reliability can be provided.

The effects of the magnetic layer of the foregoing structure can be obtained through the following functions. The functions of the present invention will be explained below, referring to use of a body centered cubic (bcc) metal such as alloys composed mainly of at least one of Cr, Mo and W and their alloys such as Cr—Ti, etc. as an underlayer. On the underlayer, the axis of magnetic anisotropy of Co is oriented to have an inplane anisotropic component so as to give a high inplane coercivity. Furthermore, by addition of at least 3 at. % of Cr, etc. to Co in the magnetic layer, a high inplane coercivity, for example, about 500 Oe or higher, can be obtained. With increasing Cr concentration, the corrosion resistance of Co alloy increases, whereas the noise of Co alloy decreases. However, the saturation magnetization is abruptly deteriorated with increasing Cr concentration, and thus more than 20 at. % of Cr to be added is not preferable.

In order to improve the saturation magnetization, the present inventors have made extensive studies of additive elements and have found that addition of Ti, Zr, Hf, V, Nb, Ta, Fe, Ru, Os, Rh, Ir, Pd, La, Sm, Pr, etc. can increase the saturation magnetization, but the media noise at the read and write runs is large with these additive elements. That is, the saturation magnetization could be improved, whereas there appeared a new problem of an increase in the media noise. Thus, in order to reduce the media noise, the present inventors have also made extensive studies of other additive elements, and have found that the media noise can be reduced by adding at least one element selected from the group consisting of Ti, Zr, Hf, Nb, Ta, Ru and Rh, that is, the aforementioned second group, used as additive elements for the, improvement of the saturation magnetization and also by adding at least one element selected from the group consisting of Al and Si, that is, the aforementioned third group, thereto. Neither deterioration of corrosion resistance nor reduction in the saturation magnetization has been observed at all in that case.

In case of magnetic layers using materials X other than Cr, selected from the aforementioned first group, the same function and effects as in case of Cr can be obtained.

The reduction in the media noise seems mainly due to the fact that an alloy of material Y' selected from the second group and material Z selected from the third group segragates at the magnetic crystalline grain boundary. That is, the alloy is nonmagnetic and thus the magnetic interaction (exchange coupling, magnetostatic coupling, etc.) is reduced among the magnetic crystalline grains. As a result, the number of crystalline grains constituting the minimum unit region (cluster) of magnetization reversal is decreased, as compared with that of the conventional crystalline grains. (A possible minimum cluster is composed of a simple crystal grain.) Thus, the width of magnetic transition region as a cause for media noise is narrowed, resulting in reduction of media noise. Particularly when a magnetic layer is formed so as to contain 0.1 at. % to 15 at. % of oxygen, the magnetic crystalline grains are made finer and the magnetic grain boundaries are made thicker and/or denser to reduce the magnetic interaction much more. Thus, the, media noise is further reduced and the corrosion resistance is also improved.

The desirable concentrations of the additive elements can be explained below. FIG. 2 shows media noise characteristics of magnetic recording disks prepared in the following manner, when subjected to read and write runs with a Mn—Zn ferrite ring head with a gap length of 0.6 μm. The magnetic disks were prepared by forming a Cr underlayer having a thickness of 350 nm on an Al—Mg alloy substrate plated with Ni—P, 130 mm in diameter, a magnetic layer of $(Co_{0.90}Cr_{0.10})_{0.96-c}Ta_{0.04}Al_c$ having a thickness of 70 nm and a C (carbon) protective layer having a thickness of 40 nm successively thereon by RF magnetron sputtering at a substrate temperature of 100° C. under an argon gas pressure of 15 mTorr with an input power density of 1 W/cm². The relative head-to media speed is 15 m/sec and the recording frequency is 7 MHz. As shown in FIG. 2, the media noise is abruptly reduced with increasing Al concentration in the magnetic layer, and its reduction is saturated around 10 at. % of Al. Thus, even addition of more than 15 at. % of Al is less effective for the reduction of media noise. Furthermore, the saturation magnetization and inplane coercivity are decreased with increasing Al concentration, resulting in a decrease in the read output.

On the other hand, reduction in the total noise $N_T$ of magnetic recording system is only about 20%, when a MnZn ferrite ring head or a metal-in-gap type lead (MIG head) is used as a head and even when the media noise is reduced to 4 μVrms from 7 μVrms. Thus, addition of at least 1 at. % of Al is satisfactory and addition of 2.5 at. % or more of Al is more preferable for remarkable reduction of the media noise. Similar effects are obtained in case of addition of Si or Al—Si alloy in place of Al.

The reason why there is no significant difference in the total noise of a magnetic recording system between the media noise of 7 μVrms and that of 4 μVrms is explained as follows:

The total noise $N_T$ of the system is a function of media noise N and a head amplifier noise $N_{HA}$ and can be represented by the following equation (1):

$$N_T = \sqrt{N^2 + N_{HA}^2} \tag{1}$$

When a MnZn ferrite ring head or a metal-in-gap type head is used as a head, the head amplifier noise $N_{HA}$ becomes a constant of about 7 μVrms.

Thus, the equation (1) will be as follows:

$$N_T = \sqrt{N^2 + 7^2}$$

Thus, when N is decreased to 4 μVrms from 7 μVrms, $N_T$ will be reduced by about 20%.

Corrosion resistance of $C/(Co_{0.89}Cr_{0.11})_{0.95-b}Zr_bSi_{0.05}/Cr$ media prepared under the same conditions as above was evaluated by a temperature/humidity corrosion test at 70° C. and 85% RH, and it was found that at 1 at. % or more of Zr no read and write error was observable even after 3 weeks, and a good corrosion resistance could be obtained, whereas above 15 at. % of Zr, deterioration of saturation magnetization and inplane coercivity was remarkable and no high read output was obtained. At 1 to 15 at. % of Zr, Hc was high, i.e. 700 Oe or more. Similar effects were obtained with Ti, Hf, Nb, Ta, Ru and Rh or their alloys in place of Zr.

By allowing an Ar gas to contain 0.02 vol. % to 1.0 vol. % of oxygen when the magnetic layer of foregoing composition is formed, the magnetic layer can contain 0.1 at. % to 15 at. % of oxygen. In that case, the magnetic crystalline grains are made finer with increasing concentration of oxygen and also the oxide segregates at the grain boundary, resulting in reduction of the aforementioned magnetic interaction and improvement of the corrosion resistance.

It is needless to say that a magnetic memory apparatus of larger memory capacity with a high reliability can be provided when a magnetic recording disk, a floppy disk or a magnetic recording tape of the foregoing structure is used.

Furthermore, the first object of the present invention can be also attained by making a magnetic layer mainly from an alloy containing Co and Pt and further containing a material X composed of at least one element selected from the first group Consisting of Ni, Cr, Mo and W, a material Y' composed of at least one element selected from the second group consisting of Ti, Zr, Hf, Ta, Nb, Ru and Rh and a material Z composed of at least one element selected from the third group consisting of Al and Si.

The alloy of the magnetic layer can be represented by any one of the following general formulae:

$$(Co_{1-a}Ni_a)_{1-b-c-d}Y'_bZ_cPt_d,$$

$$(Co_{1-a'}B'_{a'})_{1-b-c-d}Y'_bZ_cPt_d, \text{ or}$$

$$(Co_{1-a-e}Ni_aB'_e)_{1-b-c-d}Y'_bZ_cPt_d,$$

where it is desirable that a concentration, 100d, of Pt is 0.1 at. % to 30 at. %, a concentration, 100c, of material Z is 1 at. % to 15 at. %, and a concentration, 100b, of material Y' is 1 at. % to 15 at. %, the balance being Co and X. B' is a material composed of at least one element selected from the group consisting of Cr, Mo and W. It is desirable that a is 0.1 to 0.5, a' is 0.01 to 0.2 and e is 0.01 to 0.15, where the concentration of inevitable impurity is disregarded. It is further desirable with respect to the reduction of media noise that the magnetic layer contains 0.1 at. % to 15 at. % of oxygen, and it is also preferable with respect of an improvement of inplane coercivity to provide an intermediate layer of nonmagnetic material composed mainly of at least one of Cr, Mo and W, and their alloys such as Cr—Ti, etc. between the magnetic layer and the nonmagnetic substrate. With magnetic recording media of the foregoing structure, magnetic memory apparatuses of high reliability suitable for a high density magnetic recording can be provided.

The effects of the magnetic layer of the foregoing structure can be obtained through the following functions. The functions of the present invention will be explained below, referring to use of a body centered cubic (bcc) metal such as alloys composed mainly of at least one of Cr, Mo and W and their alloys such as Cr—Ti, etc. as an underlayer. On the underlayer, the Co layer is grown so that the axis of magnetic anisotropy of Co is oriented to have an inplane anisotropic component and thus to give a high inplane coercivity. Furthermore, by addition of Ni, Cr, Mo, W, Pt, etc. to Co in the magnetic layer, a higher inplane coercivity, for example, about 500 Oe or higher, can be obtained.

As a result of further studies, the present inventors have found that by addition of Pt and at least one element selected from the first group consisting of Ni, Cr, Mo and W to Co, a higher inplane coercivity, an appropriately high Saturation magnetization and a high read output can be obtained, but that these alloy still have problems of large media noise and poor corrosion resistance. Thus, the present inventors have further studied addition of various elements of groups 4a, 5a, 6a, 8, 8b and 4b of the periodic table to the alloys composed of Co, Pt and the material selected from the first group, such as CoNiPt, CoCrPt, CoNiCrPt, etc. to reduce the media noise and improve the corrosion resistance while maintaining a high inplane coercivity, and have found that the material composed of at least one element selected from the third group consisting of Al and Si, as added, segregates at the magnetic crystalline boundary of a magnetic layer containing Co as the main component to reduce the magnetic interaction among the magnetic crystalline grains, thereby considerably reducing the media noise. However, it has been found that the corrosion resistance is not improved, but rather deteriorated, because it seems that the segregates at the magnetic crystalline grain boundary cause to more easily form local cells between the magnetic crystalline grains and the grain boundary. In order to solve this problem, the present inventors have studied further addition of elements of groups 4a, 5a, 6a, 8, 3b, 4b, etc. of the periodic table. As a result of evaluation of the corrosion resistance by a NaCl spray test, it has been found that the corrosion resistance can be considerably improved without any deterioration of media noise by further addition of a material composed of at least one element selected from the second group consisting of Ti, Zr, Hf, Ta, Nb, Ru and Rh, because elements of Ti, Zr, Hf, Ta, Nb, etc. form a dense passivation film at the grain boundary or elements of Ru, Rh, etc. make the oxidation-reduction potential of the magnetic crystalline grains nobler without the increase of magnetic interactions among the grains. It has. been further found that the highest corrosion resistance can be obtained without much deterioration of media noise by addition of an alloy composed of elements selected from these two groups to give these two effects. As far as the corrosion resistance is concerned, the corrosion resistance can be improved by adding Pd, Pr, etc., for example, to a CoNiPtSi-based alloy, but the media noise is increased thereby.

The concentrations of the aforementioned additive elements will be explained below. FIG. 3 shows a dependence of inplane coercivity on Ni concentration of magnetic recording disks prepared in the following manner. A Cr underlayer having a thickness of 420 nm is formed on an Al—Mg alloy substrate plated with Ni—P, 5¼" in diameter, and a magnetic layer of $(Co_{1-a}Ni_a)_{0.85}Pt_{0.05}Si_{0.05}Zr_{0.05}$ having a thickness of 60 nm is formed thereon by RF magnetic sputtering at a substrate temperature of 100° C. under an argon gas pressure of 15 mTorr with an input power density of 1.5 W/cm². It is obvious from FIG. 3 that at a Ni concentration 100a of 10 at. % to 60 at. % on the basis of Co, a high inplane coercivity, that is, 700 Oe or higher, can be obtained.

In case of magnetic recording media of $(Co_{1-a'}Cr_{a'})_{0.85}Pt_{0.05}Si_{0.05}Ta_{0.05}/Cr$ prepared in the same manner as above, a high inplane coercivity, that is, 700 Oe or higher, can be obtained at a Cr concentration 100a' of 3 at. % to 20 at. % on the basis of Co.

In case of magnetic recording media of $(Co_{1-a-e}Ni_aCr_e)_{0.85}Pt_{0.05}Al_{0.05}Zr_{0.05}/Cr$ prepared under the same conditions as above, a high inplane coercivity, that is, 700 Oe or higher, can be obtained in ranges of $0.1 \leq a \leq 0.5$ and $0.01 \leq e \leq 0.15$.

The same effects can be also obtained with Mo or W in place of Cr or with Ti, Hf, Nb, Ru, Rh or their alloys in place of Ta and Zr as additive elements to the magnetic layer.

FIG. 4 shows a dependence of the inplane coercivity of magnetic recording media of $(Co_{0.7}Ni_{0.3})_{0.9-d}Pt_dAl_{0.05}Zr_{0.05}/Cr$ prepared under the same conditions as above upon a Pt concentration d. A particularly high inplane coercivity, that is, 1,000 Oe or higher, can be obtained with a high read output at a Pt concentration 100d of 0.1 at. % to 20 at. %, preferably 2 at. % to 10 at. %.

FIG. 5 shows a result of evaluation of read and write characteristics of magnetic recording disks comprising a magnetic layer of $(Co_{0.7}Ni_{0.3})_{0.9-c}Zr_{0.05}Si_cPt_{0.05}$ having a thickness of 60 nm, a carbon (C) protective layer having a thickness of 40 nm formed thereon under the same conditions as above, and a layer of highly fluorinated liquid lubricant of perfluoroalkylpolyether by means of a Mn—Zn ferrite ring head. As shown in FIG. 5, the media noise is abruptly decreased with increasing Si concentration, and its decrease is saturated around 10 at. % of Si. Thus, addition of more than 15 at. % of Si is less effective for the reduction of media noise. Furthermore, the saturation magnetic flux density and the inplane coercivity are abruptly decreased with increasing Si concentration, resulting in a decrease in the read output.

On the other hand it is obvious therefrom that the effect on the reduction of media noise is remarkable at a Si concentration of 1 at. % or higher, preferably 3 at. % or higher in the same manner as above. The same effect is also observable in case of adding Al or an alloy of Al and Si.

Magnetic recording media of $C/(Co_{0.6}Ni_{0.4})_{0.9-b}Zr_bAl_{0.05}Pt_{0.05}/Cr$ were prepared under the same conditions as above, and their corrosion resistance was evaluated by a NaCl spray test. It was found that the corrosion resistance could be improved 5-fold or more without any deterioration of media noise by selecting a Zr concentration 100b of 1 at. % or more. Addition of more than 15 at. % of Zr was not desirable because the saturation magnetic flux density and the inplane coercivity were considerably lowered, resulting in a decrease in the read output. An inpiane coerCivity of 700 Oe or more could be obtained at a Zr concentration of 1 at. % to 15 at. %. The same effect could be also obtained with Ti, Hf, Ta, Nb, Ru, Rh and their alloys in place of Zr.

By allowing the Ar gas to contain 0.05 vol. % to 2 vol. % of oxygen when a magnetic layer is formed from the magnetic materials of the foregoing composition, the magnetic layer can contain 0.1 at. % to 15 at. % of oxygen, and the magnetic crystalline grains can be made fine with increasing concentration of oxygen and the oxide segregates at the grain boundary to reduce the magnetic interaction among the magnetic crystalline grains, thereby further reducing the media noise. At the same time, the strength of film surface passivation layer can be increased at the same time and thus the corrosion resistance can be improved.

With magnetic recording disks, floppy disks or magnetic recording tapes of the foregoing structure in combination with a magnetic head such as a MnZn ferrite ring head or a metal-in-gap type head, a magnetic memory apparatus with distinguished read and write characteristics and a high reliability can be provided.

The second object of the present invention can be attained by magnetic recording media for longitudinal recording, which comprises a nonmagnetic substrate, a nonmagnetic metallic underlayer comprising at least one metal element selected from the group consisting of Cr, Mo, W, V, Nb and Ta formed on the nonmagnetic substrate and a magnetic layer of Co-based alloy formed on the nonmagnetic metallic underlayer, the Co-based alloy comprising 1 to 35 at. % of at least one first additive element selected from the group consisting of Pt and Ir, 1 to 17 at. %, preferably 3 to 15 at. %, of at least one second additive element selected from the group consisting of Ti, Zr, Hf, V, Nb, Ta, Cr, Mo, W, Ge and Si, except for Si, whose concentration is 1 to 40 at. %, preferably 2 to 30 at. %, and 0.1 to 10 at. % of oxygen, sum total of the first and second additive element and oxygen being 2.2 to 50 at. %, the balance being Co. As shown tn FIG. 8, the thickness of the nonmagnetic metal underlayer is preferably 150 nm or more, and more preferably 200 nm or more with respect to an improvement of inplane coercivity. When the magnetic layer is formed on the metallic underlayer, the inplane components of crystalline orientation of the magnetic layer can be increased, which can improve the inplane coercivity.

When the thickness of the nonmagnetic metallic underlayer exceeds 600 nm, a problem of surface roughness is serious, and the flyability of a magnetic head is deteriorated. A larger thickness also results in a higher cost. Thus, it is desirable that the film thickness of a nonmagnetic metallic underlayer is not more than 600 nm. More preferable concentrations of the magnetic layer of Co-based alloy are 3 to 13 at. %, preferably 5 to 9 at. %, of the first additive element and 3 to 15 at. % of the second additive element, except for Si, whose concentration is 2 to 30 at. %.

The second additive elements will be further explained below: It is particularly preferable to select Cr, Mo, W, Ge and Si from the group and it is also desirable that at least one of these elements is contained as an essential additive component. That is, when the second additive elements are classified into group A consisting of Cr, Mo, W, Ge and Si and group B consisting of Ti, Zr, Hf, V, Nb and Ta, at least one element selected from the group A and at least one element selected from the group B must be contained at the same time, or at least one element selected from the group A must be contained as an essential component. A preferable concentration of the additive element from the group A is 3 to 15 at. %, as described above, except for Si, whose concentration is 2 to 30 at. %, and a preferable concentration of the additive element from the group B is 1 to 15 at. %.

The nonmagnetic metallic underlayer can be composed of at least one metal element selected from the group consisting of Cr, Mo, W, V, Nb and Ta and at least one element selected from the group consisting of Ti, Si, Ge, Cu, Pt, Rh, Ru, Re, Pd and oxygen, where a preferable concentration of at least one element selected from the group consisting of Ti, Si, Ge and Cu is 1 to 30 at. %, a preferable concentration of at least one element selected from the group consisting of Pt, Rh, Ru, Re and Pd is 0.01 to 10 at. % and a preferable concentration of oxygen is 0.1 to 10 at. %.

Such characteristics as an inplane coercive sequareness S* of not more than 0.95, preferably 0.85 to 0.4, more preferably 0.81 to 0.6 and an inplane coercivity Hc of not less than 1,200 Oe, preferably at least 1,500 Oe, can be obtained thereby, and a magnetic layer with distinguished corrosion resistance and S/N ratio can be obtained. Furthermore, addition of an appropriate amount of Ni, Al, etc. to the magnetic layer of Co-based alloy can improve the S/N ratio, though the corrosion resistance is deteriorated.

The third object of the present invention can be attained by a process for producing magnetic recording media for longitudinal recording, which comprises a step of forming a nonmagnetic metallic underlayer comprising at least one metal element selected from the group consisting of Cr, Mo, W, V, Nb and Ta on a nonmagnetic substrate by physical vapor deposition, a step of forming on the underlayer a magnetic layer of Co-based alloy comprising 1 to 35 at. % of at least one first additive element selected from the group consisting of Pt and Ir, 1 to 17 at. %, preferably 3 to 15 at. %, of at least one second additive element selected from the group consisting of Ti, Zr, Hf, V, Nb, Ta, Cr, Mo, W, Ge and Si, except for Si, whose concentration is 1 to 40 at. %, preferably 2 to 30 at. %, and 0.1 to 10 at. % of oxygen, total of the first and second additive elements and oxygen being 2.2 to 50 at. %, the balance being Co, in an inert gas containing a very small amount of oxygen by sputtering of a target containing the first and second additive elements, and a step of forming on the magnetic layer a protective layer. It is preferable to provide a step of forming an underlayer of nonmagnetic plating film such as a Ni—P plating film, etc. in advance to the step of forming the nonmagnetic metallic underlayer. The nonmagnetic metallic underlayer and the magnetic layer of Co-based alloy can be formed by sputtering, vapor deposttion, plating, ion beam deposition, etc. Particularly, DC magnetron sputtering is preferable in respect to the deposition rate and layer quality control.

The nonmagnetic metallic underlayer comprising at least one metal element selected from the group consisting of Cr, Mo, W, V, Nb and Ta to be formed on the nonmagnetic substrate by physical vapor deposition can contain at least one element selected from the group consisting of Ti, Si, Ge, Cu, Pt, Rh, Ru, Re, Pd and oxygen as a secondary component. In that case, a preferable concentration of at least one element selected from the group consisting of Ti, Si, Ge and Cu is 1 to 30 at. %, a preferable concentration of at least one element selected from the group consisting of Pt, Rh, Ru, Re and Pd is 0.01 to 10 at. %, and a preferable concentration of oxygen is 0.1 to 10 at. %.

Furthermore, it is preferable to form a magnetic layer of Co-based alloy containing 3 to 13 at. %, preferably 5 to 9 at. %, of the first additive element and 3 to 15 at. % of the second additive element, except for Si, whose concentration is 2 to 30 at. %.

The second additive element will be further explained below. It is particularly preferable to select Cr, Mo, W, Ge and Si from the group.and it is desirable to contain at least one of these elements as an essential component. That is, when the second additive elements are classified into group A consisting of Cr, Mo, W, Ge and Si and group B consisting of Ti, Zr, Hf, V, Nb and Ta, at least one element selected from the group A and at least one element selected from the group B must be contained at the same time, or at least one element selected from the group A must be contained as an essential component. A preferable concentration of the element of group A is 3 to 15 at. % except for Si, whose concentration is 2 to 30 at. %, and a preferable concentration of the element of group B is 1 to 15 at. %, as mentioned before. A magnetic layer must be formed under sputtering conditions that can satisfy the foregoing concentrations.

It is desirable to form a magnetic layer by sputtering, while maintaining the underlayer substrate in a heated state, which is practically preferably at 100° to 350° C. Above 350° C., the underlayer substrate will react with the magnetic layer, whereas at a temperature below 100° C. intermetallic compounds are easy to form, and the coercive squareness becomes abnormally larger. It is preferable to chemically and/or physically roughen the surface of a substrate (grooves, irregularities or scars) by an etching and/or abrasing treatment, for example, generally called "texturing treatment" in advance as a preliminary step for forming a magnetic layer. For example, by making fine grooves, irregularities or scars, 2 nm to 30 nm in terms of centerline average roughness on a disk substrate in the moving direction of a magnetic head, the crystalline grains of the nonmagnetic metallic underlayer on the disk substrate surface and the magnetic layer formed thereon undergo crystalline orientation particularly in the moving direction of the magnetic head, whereby magnetic properties such as squareness, inplane coercivity, etc. in the moving direction of the magnetic head can be considerably improved. The texturing treatment can contribute to an improvement of magnetic properties in accordance with the substrate heating when a magnetic layer is formed. Particularly, the disks with surface irregularities and/or scars are preferable to show much improved CSS (contact-start/stop) characteristic.

The reasons why the second and third objects of the present invention can be attained will be explained in detail below:

The nonmagnetic metallic underlayer of pure metal or an alloy comprising at least one metal element selected from the group consisting of Cr, Mo, W, V, Nb and Ta, provided on the nonmagnetic substrate, gives a large influence on the crystallographic orientation and the magnetic properties of a magnetic layer of Co-based alloy to be formed on the surface of the nonmagnetic metallic underlayer. That is, the above-mentioned nonmagnetic metallic underlayer has a body-centered cubic structure and is liable to have a (110) orientation on the nonmagnetic substrate. The magnetic layer to be formed thereon easily undergoes epitaxial growth and thus has more inplane components of magnetic anisotropy. Thus, the nonmagnetic metallic underlayer acts to increase the inplane coercivity Hc of the magnetic layer.

FIG. 13A and FIG. 13B show X-ray diffraction patterns of magnetic recording media for longitudinal recording and the crystallographic orientation and the crystallinity of magnetic layers and underlayers according to embodiments of the present invention, respectively. That is, a CrTi alloy underlayer with various Ti concentrations of 1 to 30 at. % having a thickness of 10 to 500 nm, a magnetic layer of Co-15 at. % Cr-8 at. % Pt-1 at. % Si having a thickness of 50 nm, and a C protective layer having a thickness of 30 nm were formed on a strengthened glass substrate, 3.5" in diameter, in succession by DC sputtering in a Ar gas atmosphere containing 0.1 vol. % of oxygen at a substrate temperature of 110° C. under a gas pressure of 10 mTorr with an input power density of 1 W/cm$^2$.

As shown in FIG. 13B, CrTi mainly takes a (100) orientation when the CrTi underlayer has a thickness of less than 0.05 μm, and the component of (110) orientation will abruptly increase when the CrTi underlayer thickness exceeds 0.15 μm (150 nm) and the CoCrPtSi magnetic layer will also epitaxially grow and take a (10$\bar{1}$1) orientation with the inplane c-axis component. Here, c-axis is the principal axis of the magnetic anisotropy of CoCrPtSi. By providing a CrTi underlayer, the (10$\bar{1}$0) orientation, where the c-axis exists in the plane, will also develop at the same time. Thus, by providing a CrTi underlayer, the (10$\bar{1}$1) and (10$\bar{1}$0) orientations, where the c-axis of CoCrPtSi has inplane components, are developed, resulting in a higher inplane coercivity. In that case, the magnetic layer has an oxygen concentration of 2 at. %.

Relationships shown in FIGS. 13A and 13B are not limited to CoCrPtSi and CrTi, and also hold valid in other embodiments of the present invention.

The thickness of the nonmagnetic metallic underlayer also plays an important role to control not only the inplane coercivity Hc, but also the coercive squareness S*, as will be explained, referring to FIG. 8.

FIG. 8 is a diagram of characteristic curve showing relationships between the thickness of nonmagnetic metallic underlayer and the magnetic properties Hc and S* of magnetic recording media prepared by forming an Ni—P plating layer on a nonmagnetic Al—Mg alloy disk substrate by a known method, and then forming a nonmagnetic metallic underlayer (exemplified by Cr in this case) and a magnetic layer (exemplified by $Co_{80}Cr_{10}Pt_{10}$ in this case) of the present invention thereon in succession at a substrate temperature of 150° C., where the thickness of the magnetic layer of the magnetic recording media is made constant to 75 nm. Here 2 at. % of oxygen is contained in the magnetic layer.

As is obvious from FIG. 8, a remarkable abrupt change is observable around an underlayer thickness of 150 nm, that is, the inplane coercivity Hc exceeds 1,200 Oe in the region where the inplane coercive squareness S* is lower than 0.85, and when the underlayer thickness exceeds 200 nm, S* becomes less than 0.8 and Hc becomes exceeds 1,500 Oe, resulting in a higher recording density and in a higher S/N ratio. That is, an increased underlayer thickness can improve the crystalline orientation of underlayer and thus can drastically improve the magnetic properties. In this manner, the overall strength of the layers in combination is improved and thus the antiwear properties are also improved. However, when the underlayer thickness exceeds 600 nm, the nonmagnetic metal that forms the underlayer is liable to grow abnormally and the roughness of magnetic layer surface is increased. That is, the magnetic layer surface becomes coarser and the magnetic head flyability will be deteriorated. The production cost will also be higher in this case. Thus, it is desirable that the underlayer thickness is not more than 600 nm. That is, a practically preferable thickness of nonmagnetic metallic underlayer is 150 to 600 nm, more preferably 200 to 450 nm.

Relationships between the inplane coercive squareness S* and the media noise of magnetic recording media are shown by a characteristic curve in FIG. 11. When S* exceeds 0.85, the media noise abruptly increases, whereas when S* becomes less than 0.4, the read output waveform will be deformed. Thus, a practical S* is 0.85 to 0.4, preferably 0.81 to 0.5, more preferably 0.75 to 0.6.

When the nonmagnetic metallic underlayer of Cr, Mo, W, etc. contains 0.1 to 10 at. % of oxygen, the crystalline grains in the magnetic layer, which epitaxially grows thereon, will have grain sizes of not more than 100 nm, resulting in a decrease in the media noise. Thus, this is particularly preferable. However, when the oxygen concentration of the underlayer exceeds 10 at. %, the epitaxial growth is considerably suppressed and the inplane coercivity will be deteriorated.

Furthermore, at least one element selected from the group consisting of Ti, Si, Ge, Cu, Pt, Ru, Rh, Re and Pd to be contained in the nonmagnetic metallic underlayer can make the crystalline grains of the underlayer finer as in the case of oxygen as contained, and can also make the coercive squareness of a magnetic layer to be formed thereon not more than 0.85, resulting in a decrease in the media noise. In this case, as shown in FIG. 13A and FIG. 13B, the crystalline orientation of the underlayer will be increased, and as shown in FIG. 15 the effect upon the inplane coercivity and the read output is also increased. Thus, this is particularly preferable. Practically preferable concentrations of these elements are 1 to 30 at. % for at least one element selected from the group consisting of Ti, Si, Ge and Cu and 0.01 to 10 at. % for at least one element selected from the group consisting of Pt, Ru, Rh, Re and Pd. A lower concentration will make the effect unsatisfactory, whereas a higher concentration will suppress the epitaxial growth, deteriorate the inplane coercivity or excessively increase the S*, resulting in deterioration of the read and write characteristics. Thus, a lower or higher concentration is not desirable.

It is particularly preferable to treat the substrate underlayer surface of Ni—P, etc. to have fine scars and/or grooves substantially in the head moving direction as a preliminary step before the formation of a nonmagnetic metallic underlayer to make a centerline average roughness Ra of 1 to 10 nm in the head moving direction and 2 to 30 nm in the direction perpendicular to the head moving direction, whereby the inplane coercivity can be made higher in the head moving direction than in the radial direction and also the read output can be made higher by one tenth to two tenths. Thus, this is particularly preferable and is due to the so called graphoepitoxial effect that a nonmagnetic metallic underlayer develops in accordance with the shape of the substrate underlayer, as clarified by observation with SEM, etc. When Ra in the radial direction is not more than 2 nm, the effect is smaller, whereas when it is more than 30 nm, the antiwear properties will be deteriorated.

Relationships between the concentrations of magnetic layer of Co-based alloy and the magnetic properties will be explained below.

The role of 1 to 35 at. % of at least one first additive element selected from the group consisting of Pt and Ir to be contained in a composition containing Co as the main component is principally to increase the inplane coercivity. However, this role can be played through an interaction in the presence of 1 to 17 at. %, preferably 3 to 15 at. % of at least one second additive element selected from the group consisting of Ti, Zr, Hf, V, Nb, Ta, Cr, Mo, W, Ge and Si, except for Si, whose concentration is 1 to 40 at. %, preferably 2 to 30 at. %, and 0.1 to 10 at. % of oxygen, as in the case of the inplane corecire squareness S*, and the role is not played through the single action of the individual first additive elements for the following facts gathered by the present inventors from the following experimental results. A higher inplane coercivity can be easily obtained by adding only the first additive element (Pt and It) to Co, but it is difficult to stably obtain a high coercivity of 1,000 Oe or more only through such combinations as above, and furthermore the media noise is higher and a higher S/N ratio is hard to obtain. The present inventors have found that magnetic recording media with higher inplane coercivity Hc and crystalline orientation and a higher S/N ratio even at a high density recording can be obtained by adding the first additive. element and the second additive element to Co and making a magnetic layer therefrom in a discharge gas atmosphere containing oxygen. When Co contains the second additive element and when the discharge gas atmosphere such as Ar, etc. contain an oxygen gas at the formation of a magnetic layer by sputtering, the second additive element segregates at the grain boundary and in the grains with the help of the oxygen to reduce the magnetic interaction among the magnetic crystalline grains and improve the crystalline orientation, and consequently the media noise of magnetic recording media will be reduced. When only the second additive element is added to Co without the first additive element, the inplane coercivity Hc is decreased, and thus the read output is liable to decrease. When the first additive element and the second additive element are added to Co at the same time as in the present invention, the inplane coercivity Hc is also increased, as shown in FIG. 16, and thus the media noise is lower than that in the case of only addition of the first additive element (Pt and Ir) to Co. Thus, a higher S/N ratio can be obtained as a result. The magnetic recording media shown in FIG. 16 has a magnetic layer of CO-15 at. % Cr-7 at. % Pt-3 at. % Si having a thickness of 65 nm, a Cr underlayer having a thickness of 350 nm and a C protective layer having a thickness of 40 nm. In this case, it is desirable that the magnetic layer has an oxygen concentration of 0.1 at. % or more. When the oxygen concentration of the magnetic layer exceeds 10 at. %, the oxidation considerably proceeds, and the saturation magnetization and the inplane coercivity are also lowered, resulting in a considerable decrease in the read output. Thus, a practically preferable oxygen concentration is 0.1 to 10 at. %. The oxygen concentration of the magnetic layer can be adjusted to a desired value in case of making the layer, for example, by sputtering while adjusting the oxygen partial pressure in the discharge gas atmosphere of Ar, etc.

In the foregoing, functions and the effective concentrations of the additive elements have been explained, and it is desirable that the sum total of the additive elements including the oxygen is 50 at. % at most, that is, Co as the main component that constitutes the balance has a concentration of at least 50 at. %.

The foregoing functions will be further explained below from the crystallographic viewpoint.

When a magnetic layer is formed on a nonmagnetic substrate through a nonmagnetic metallic underlayer by sputtering in an Ar gas containing 0.1 vol. % of oxygen, as explained before, an inplane coercivity Hc of 1,200 Oe or more can be obtained at a concentration of the first additive element (exemplified by Pt) of 1 to 35 at. %, as shown in FIG. 6. By adding Pt to Co, a Co—Pt ordered plase appears in the crystalline grains to suppress the movement of magnetic domain boundary. The inplane coercivity becomes maximum at a Pt concentration of 13 at. %. In connection to the appearance of Co—Pt ordered plase, the mechanism of the development of inplane coercivity is different between a magnetic layer having a Pt concentration of more than 13 at. % and a magnetic layer having a Pt concentration of less than 13 at. %, and particularly a dynamic magnetization reversal takes place smoothly at a Pt concentration of less than 13 at. %. Correspondingly, magnetic recording media having a Pt concentration of less than 13 at. % have particularly high overwrite characteristics and have a high efficiency of leakage recording in the track width direction, a high efficiency of erase and an effect of broad margin for a position error at the read and write runs with a magnetic recording head. The effect is particularly remarkable at a Pt concentration of 9 at. % or less. Thus, a preferable Pt concentration is less than 13 at. %, more preferably, 9 at. % or less. With increasing Pt concentration saturation magnetization is slowly decreased. That is, there is such a tendency that the saturation magnetization will be decreased and the media noise will be relatively increased at a Pt concentration of 3 at. % or more, and, as shown in FIG. 9 the S/N ratio becomes particularly high at a Pt concentration of 1 to 3 at. %. Furthermore, Pt and Ir are expensive noble metals, and addition of these metals in an unnecessarily large amount is not preferable with respect to cost. A practically more preferable concentration of Pt is 1 to 3 at. %, as described above. When the concentration of the first additive element such as Pt is more than 3 at. %, it is desirable to improve the overwrite characteristics by making a concentration of Pt and Ir less than 13 at. %, preferably 9 at. % or less, as described above, and also to improve the corrosion resistance by making a concentration of Co less than 75 at. % to considerably reduce the media noise, resulting in an increase in the S/N ratio. As the second additive element to be added to Co together with the first additive element such as Pt, a group of Ge and Si are particularly desirable besides Cr, Mo and W as shown in FIG. 6, and it is needless to say that other elements of the group, i.e. Ti, Zr, Hf, V, Nb and Ta are also effective. Particularly, in case of quaternary magnetic alloys containing the other elements of the group, oxides or hydroxides of these elements predominantly segregate on the surface or at the crystalline grain boundary to considerably improve the corrosion resistance, as compared with the ternary alloys, as shown in FIG. 12. Thus, the quaternary magnetic alloys are particularly preferable. FIG. 12 shows a relative magnetization Ms(t)/Ms(o) indicating a degree of deterioration due to corrosion on the ordinate and time (hr) of NaCl spray test at 40° C. on the abscissa, and shows that the magnetic layers maintaining a relative magnetization of initial level for a longer time have a good corrosion resistance. Magnetic layers of Co-20 at. % Si-8 at. % Pt, Co-10 at. % Ge-8 at. % Pt and Co-8 at. % Pt (comparative) likewise formed have relative magnetizations of 0.85, 0.82 and 0.75, respectively, 4 hours after the NaCl spray test.

In the quaternary magnetic alloys of the present invention, Ti, Zr, Hf, V, Nb, Ta, etc. segregate at the crystalline grain boundary and in the crystalline grains owing to the synergistic effect of Cr, Mo, etc. to reduce the magnetic interaction among the crystalline grains and improve the read and write characteristics, as described before, and thus the quaternary magnetic alloys are more desirable than the ternary magnetic alloys of CoPt containing one of Cr, Mo, W, Ge, Si, etc. In FIG. 12, only the Co—Cr—Pt-based magnetic alloys are exemplified, but Mo, W, Si, and Ge hold valid in place of Cr. A preferable concentration of at least one of these other elements of the group is 1 to 15 at. %.

FIG. 7 shows relationships between the Cr. concentration and the inplane coercivity Hc when Cr is added to Co—Pt as typical of the second additive element, and it is desirable to add at least 1 at. %, particularly 3 at. % or more of Cr to Co—Pt, because the inplane coercivity exceeds 1,200. Oe thereby. Addition of more than 17 at. % of Cr is not desirable, because the saturation magnetization is deteriorated. Thus, an effective concentration of the second element is 1 to 17 at. %, except for Si, whose effective concentration is 1 to 40 at. %.

The nonmagnetic metallic underlayer of magnetic recording media shown in FIGS. 6 and 7 is composed of Cr, and it is needless to say that similar effects can be obtained with other than Cr, i.e. Mo, W, V, Nb or Ta or alloys containing these metals as the main component.

The concentration of oxygen in the magnetic layer will be described in more detail below.

When the present Co-based alloy containing the first and second additive elements further contains 0.1 to 10 at. % of oxygen, not only the component of inplane ($10\bar{1}0$) orientation (as will be hereinafter referred to "(100) orientation") of hexagonal closed packed (hcp) structure, but also the component of perpendicular (0001) orientation (as will be hereinafter referred to as "(001) orientation") is increased even on a nonmagnetic metallic substrate of body-centered cubic (bcc) structure of Cr, Mo, W, etc. That is, from the crystallographic viewpoint, a ratio of 002 X-ray diffraction peak intensity to 100 X-ray diffraction peak intensity of Co-based alloy becomes more than 3 as shown in FIG. 13A and FIG. 13B, and from the magnetic viewpoint, a perpendicular anisotropy is given in addition to the basic inplane anisotropy, and the c-axis of Co-based alloy becomes substantially isotropic. As shown in FIG. 8, the inplace coercive squareness S* will be 0.85 or less, or further 0.8 or less with increasing thickness of the nonmagnetic metallic underlayer, because the second additive element such as Cr, Mo or W is liable to segregate not only at the crystalline boundary but also in the crystalline grains with the help of oxygen and/or the crystalline grains are made finer and/or the crystalline grains component that perpendicularly orient are increased. With an increase in the perpendicular anisotropy, the width of magnetic transition region becomes smaller, resulting in a decrease in the media noise. Thus, this is preferable. The oxygen concentrations of the magnetic layers of the present invention shown in FIGS. 6 and 7 are 1 and 1.5 at. %, respectively.

The fourth object of the present invention can be attained by a magnetic memory apparatus, which comprises a magnetic recording medium, a driving means for turning the magnetic recording medium, a magnetic head, a head access means, and a read and write means for the magnetic head, where the magnetic recording medium is composed of a magnetic recording medium for longitudinal recording, capable of attaining the first or second object or both objects of the present invention.

When the present magnetic recording media were subjected to read and write runs with a metal-in-gap (MIG) type or thin film head provided with a ferromagnetic metal such as Co—Nb—Zr, Fe—Al—Si, Ni—Fe, etc. at a position near the working gap, it was found that the read output was remarkably increased at an inplane coercivity Hc of 1,200 Oe or more in the circumferential direction of disk, as shown in FIG. 10. An inplane coercivity of 1,500 or more is more preferable, because the recording density can be further increased. When at least a portion of the magnetic pole is made of a ferromagnetic metal as mentioned above, the recording magnetic field can be intensified. Thus, use of a ferromagnetic metal is quite suitable for a magnetic recording medium with a high coercivity as in the present invention and can improve the read and write characteristics, particularly in a magnetic memory apparatus of larger capacity.

BRIEF DESCRIPTION OF THE DRAWINGS

FIGS. 13A and 13B are diagrams showing an X-ray diffraction pattern and crystallographic orientation of magnetic recording media according to the present invention.

FIG. 14A shows a magnetic memory apparatus which comprises a magnetic recording medium and a driving means or magnetic media drive system for turning the magnetic recording medium. In addition, a magnetic head for reading and writing to and from the magnetic recording medium is shown. Also, there is a magnetic head access system which is in operative connection with the magnetic head for positioning the magnetic head with respect to the magnetic recording medium. A read and write system is operatively connected with the magnetic head.

DETAILED DESCRIPTION OF THE PREFERRED EMBODIMENTS

EXAMPLE 1

Figure 1:
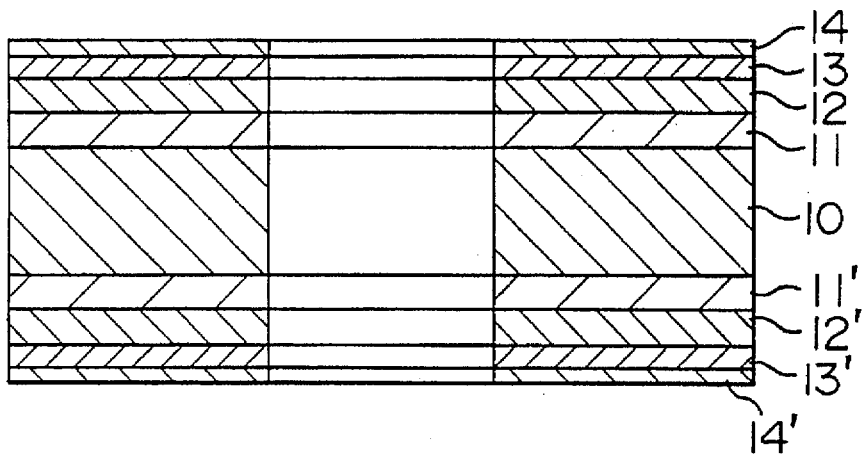
FIG. 1 is a vertical cross-sectional view of a magnetic recording medium according to one embodiment of the present invention.
Figure 2:
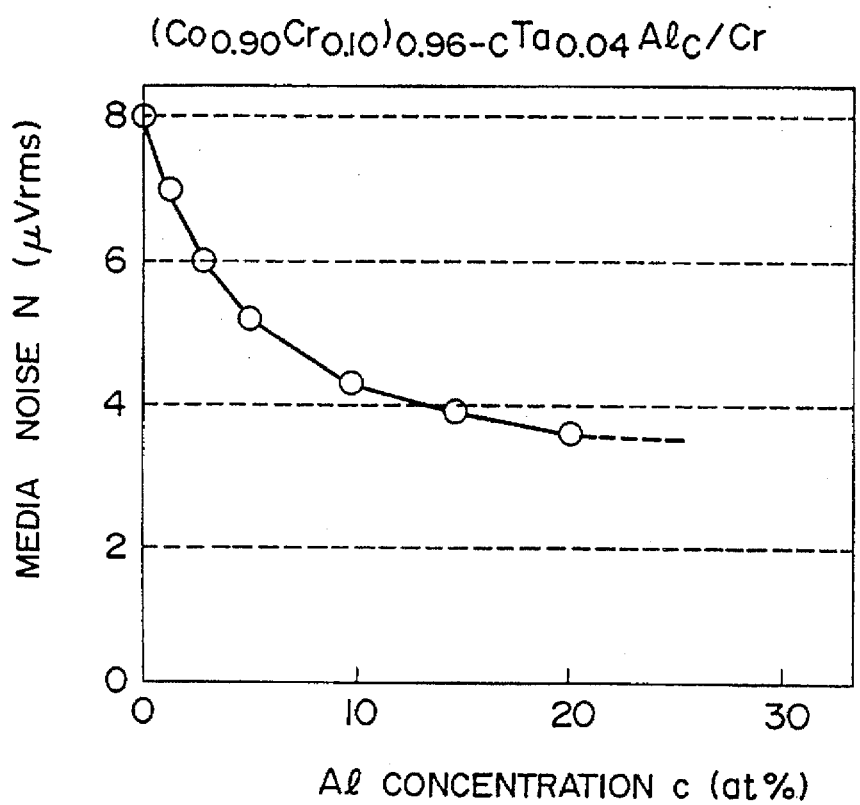
FIG. 2 is a characteristic diagram of media noise of magnetic recording media according to the present invention.
Figure 3:
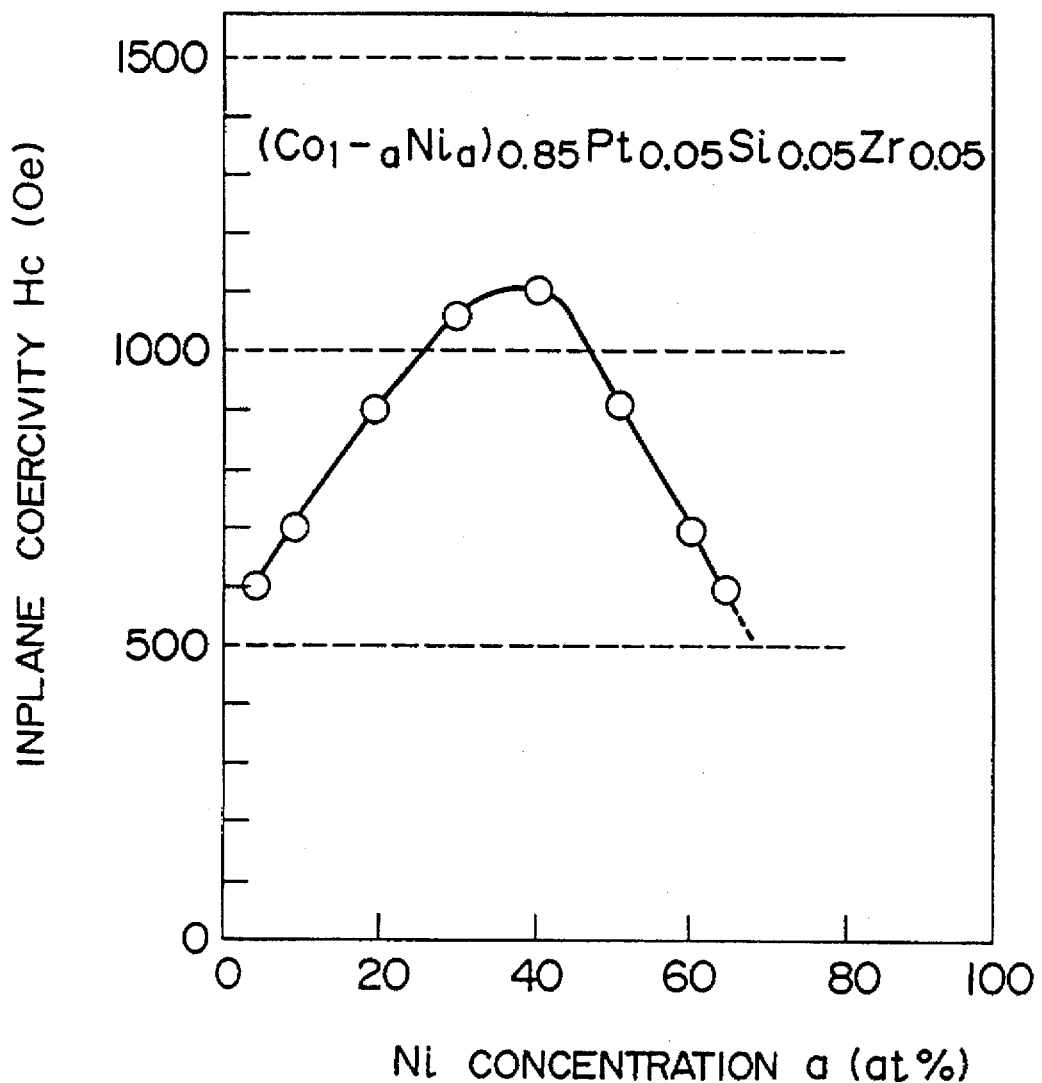
FIGS. 3 and 4 are characteristic diagrams of inplane coercivity of magnetic recording media according to the present invention.
Figure 4:
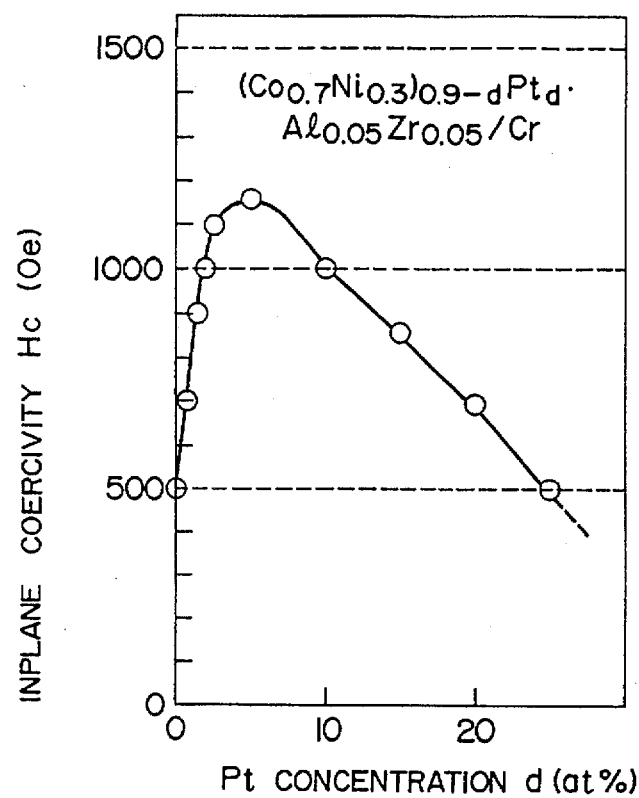
Figure 5:
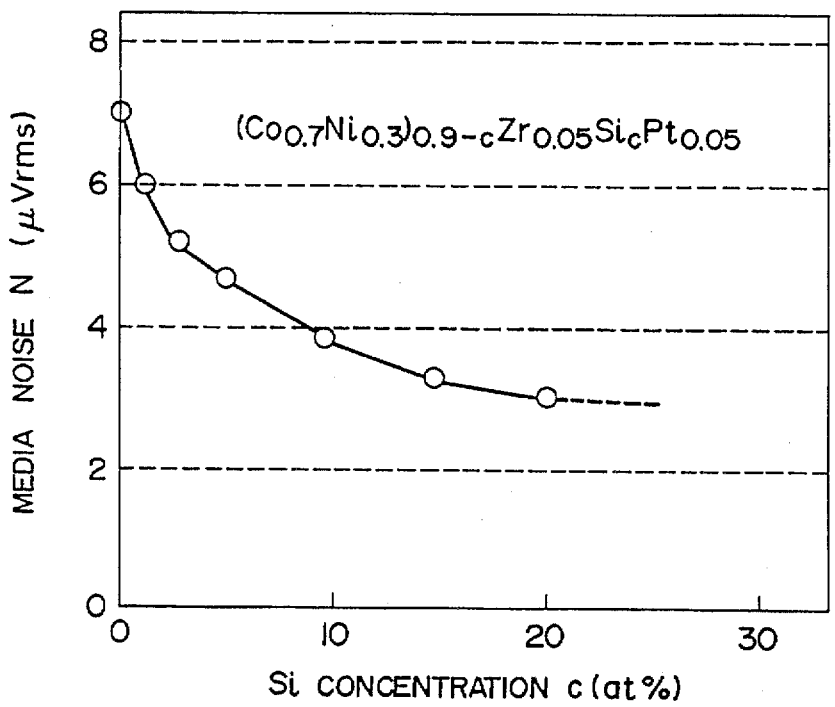
FIG. 5 is a noise diagram of magnetic recording media according to the present invention.
Figure 6:
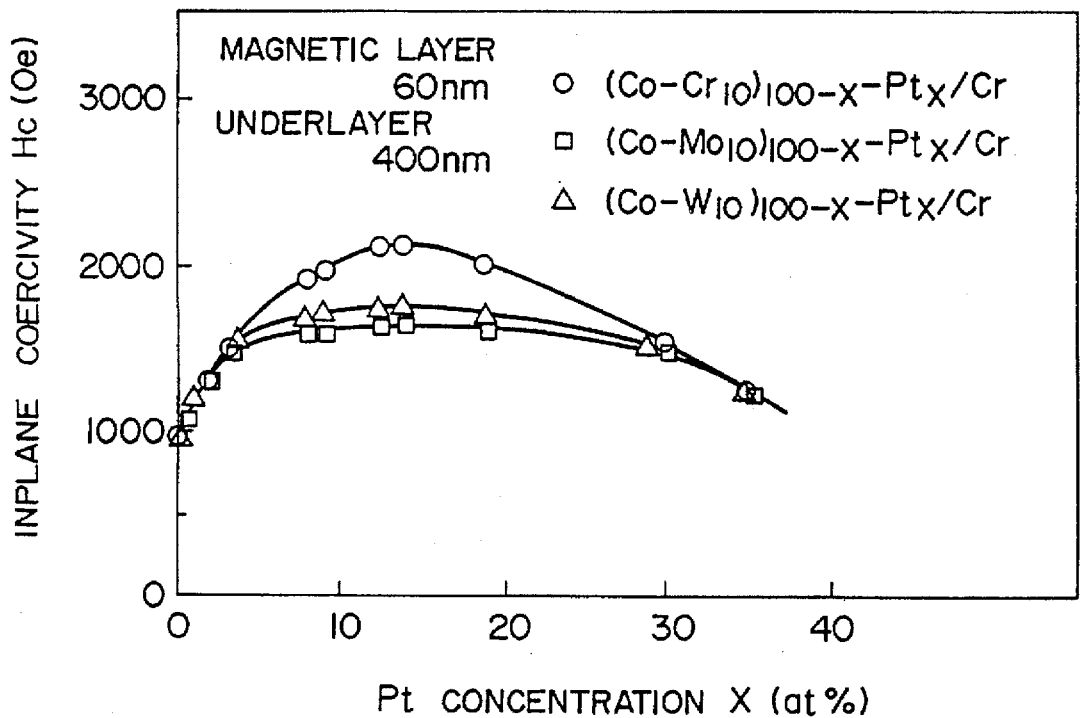
FIG. 6 is a characteristic curve diagram showing relationships between a Pt concentration of a magnetic layer and an inplane coercivity Hc of magnetic recording media according to the present invention.
Figure 7:
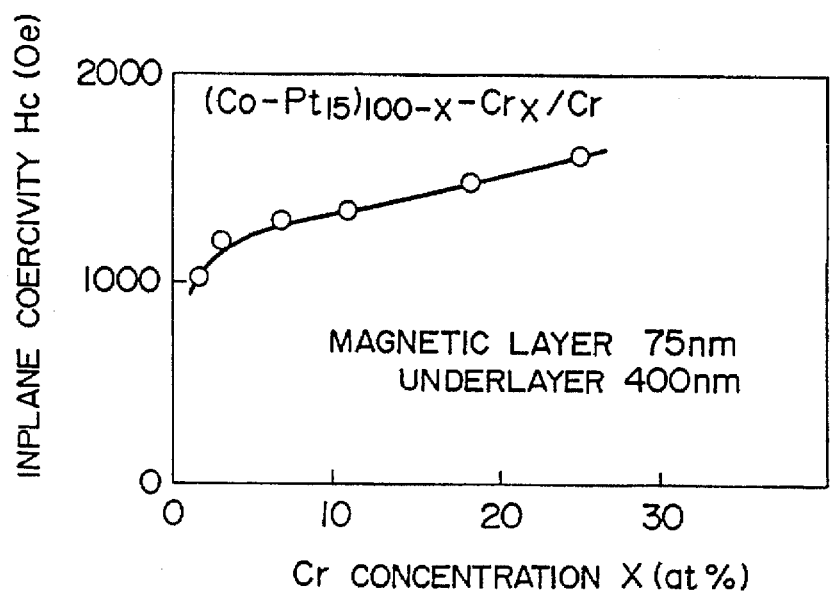
FIG. 7 is a characteristic curve diagram showing relationships between a Cr concentration of a magnetic layer and a inplane coercivity Hc of magnetic recording, media according to the present invention.
Figure 8:
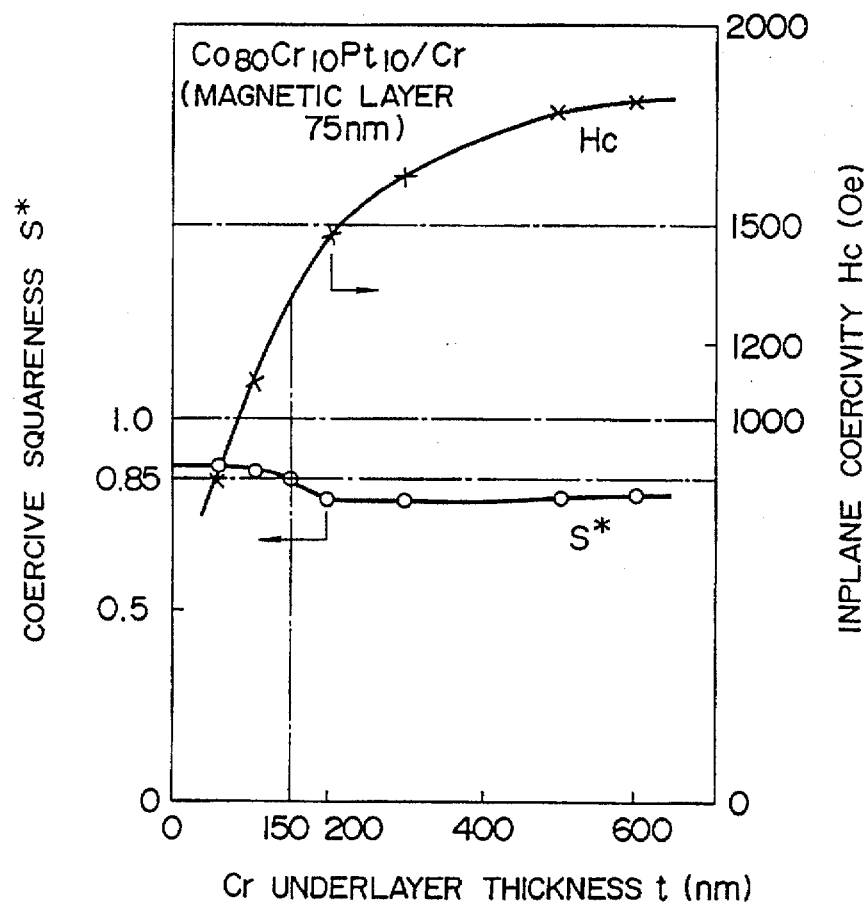
FIG. 8 is a characteristic curve diagram showing relationships between an underlayer thickness, and a coercive squareness and an inplane coercivity of magnetic recording media according to the present invention.
Figure 9:
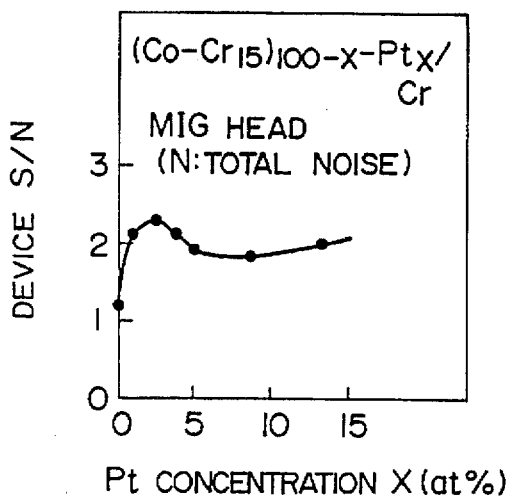
FIG. 9 is a diagram showing relationship between a Pt concentration and a device S/N ratio of magnetic recording media according to the present invention.
Figure 10:
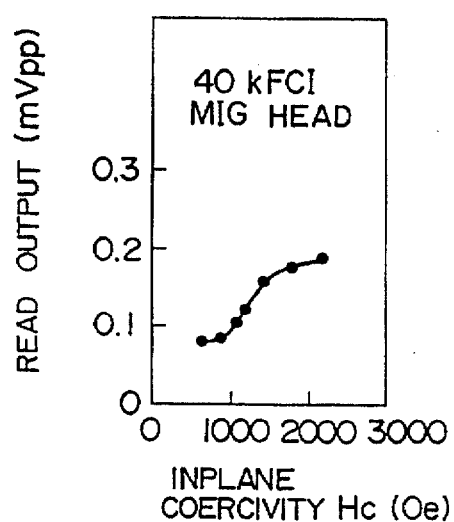
FIG. 10 is a characteristic curve diagram showing relationships between an inplane coercivity and read output of recording magnetic media according to the present invention.
Figure 11:
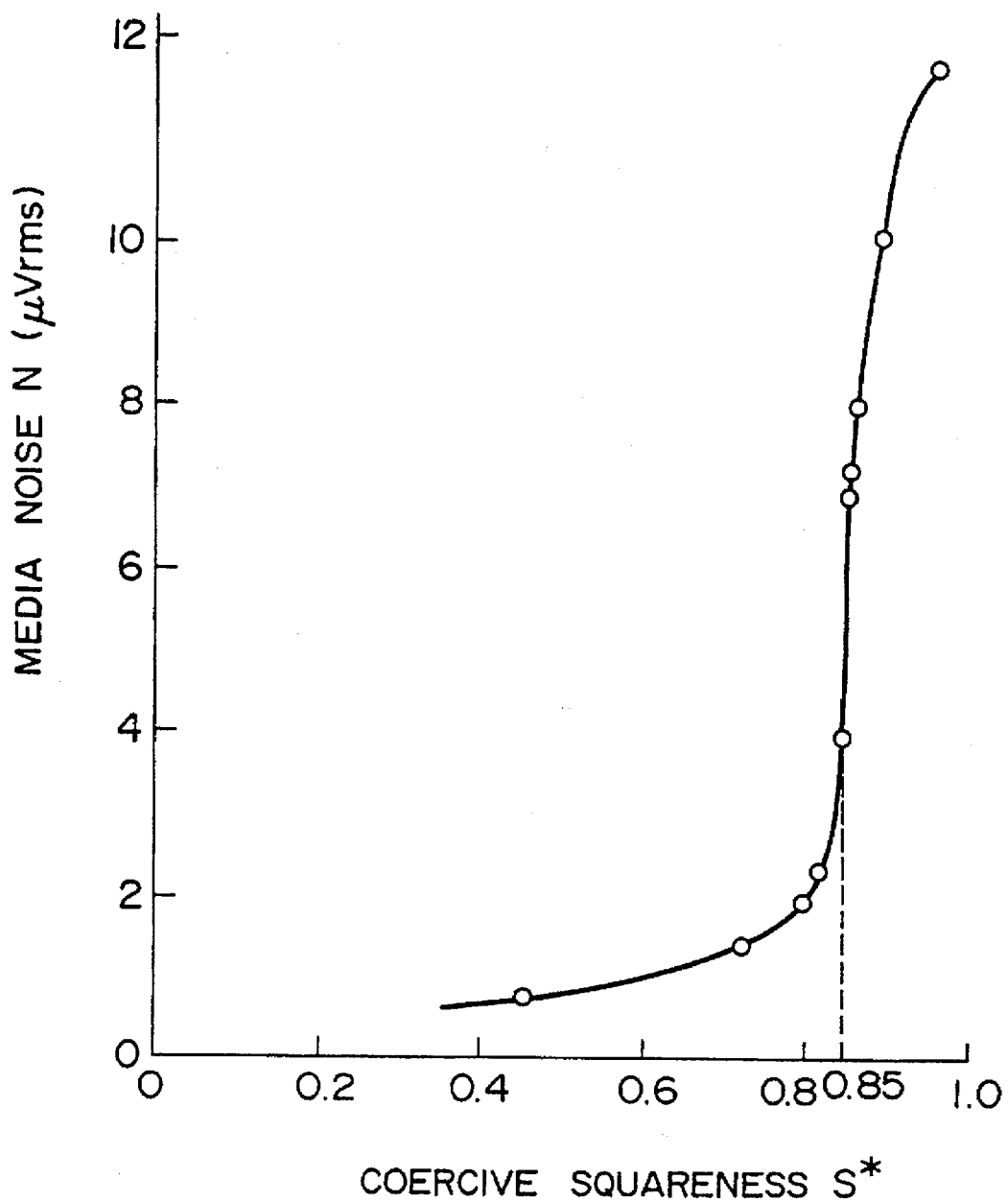
FIG. 11 is a characteristic curve diagram showing relationships between an inplane coercive squareness S* and a media noise of magnetic recording media according to the present invention.
Figure 16:
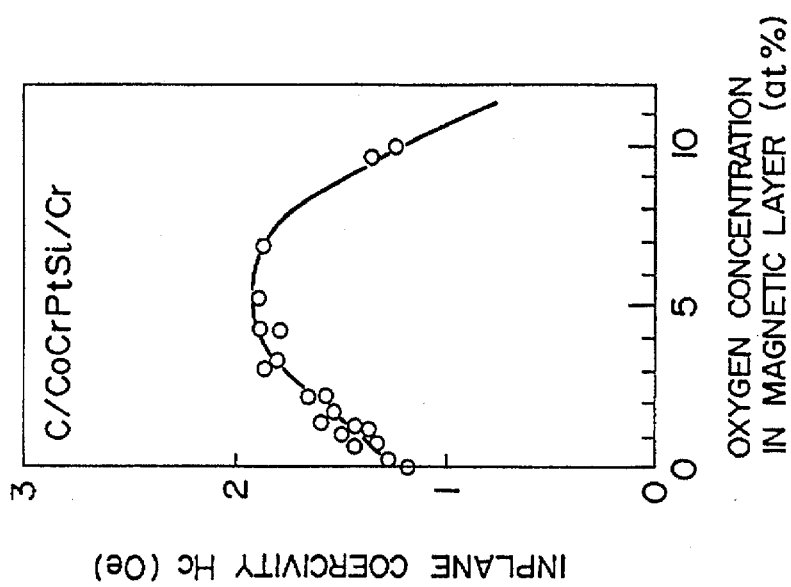
FIG. 16 is a diagram showing magnetic properties of magnetic recording media according to the present invention.
Figure 12:
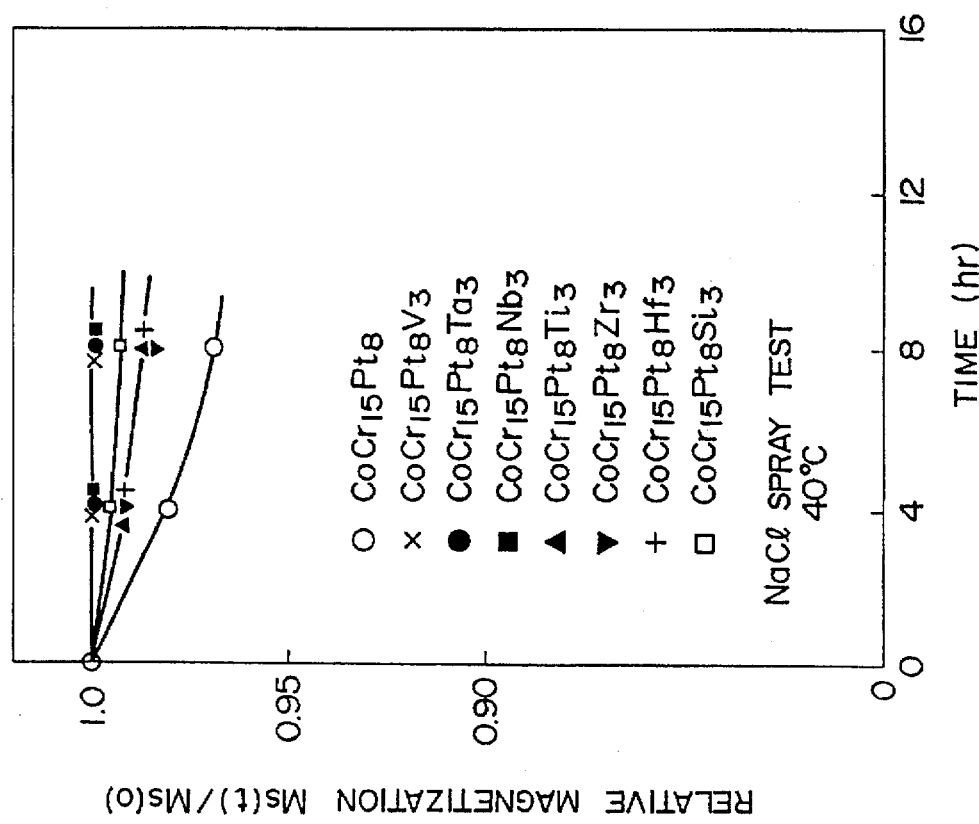
FIG. 12 is a characteristic curve diagram of corrosion resistance of CO—Cr—Pt-based, quaternary magnetic alloy layer of magnetic recording media according to the present invention.
Figure 13B:
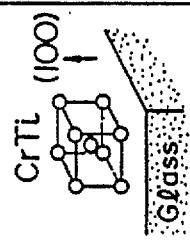
Figure 14A:
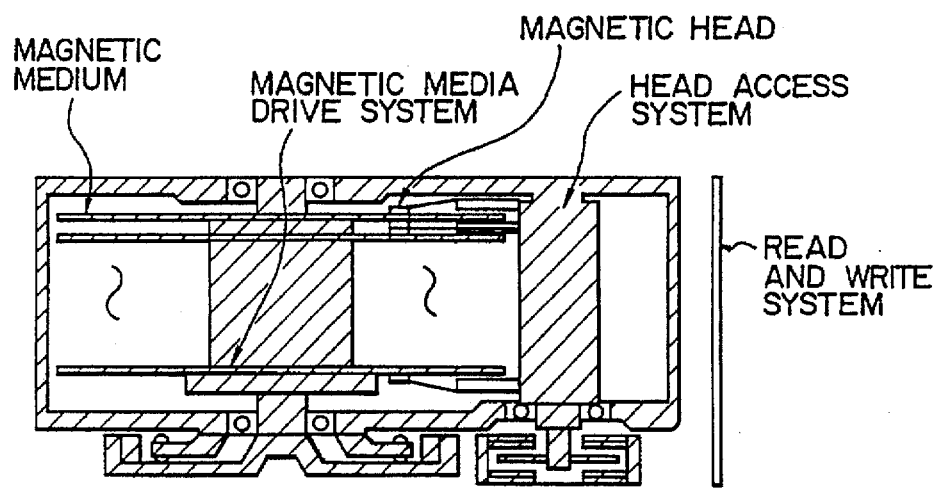
FIGS. 14A and 14B are vertically cross-sectional and plan schematic views of a magnetic memory apparatus according to the present invention, respectively.
Figure 14B:
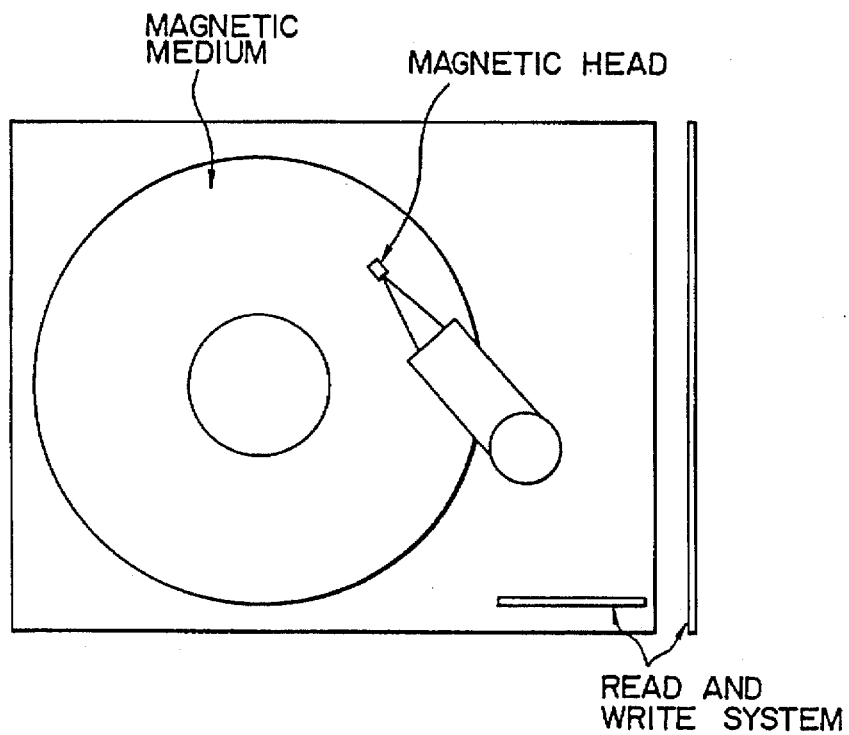
Figure 15:
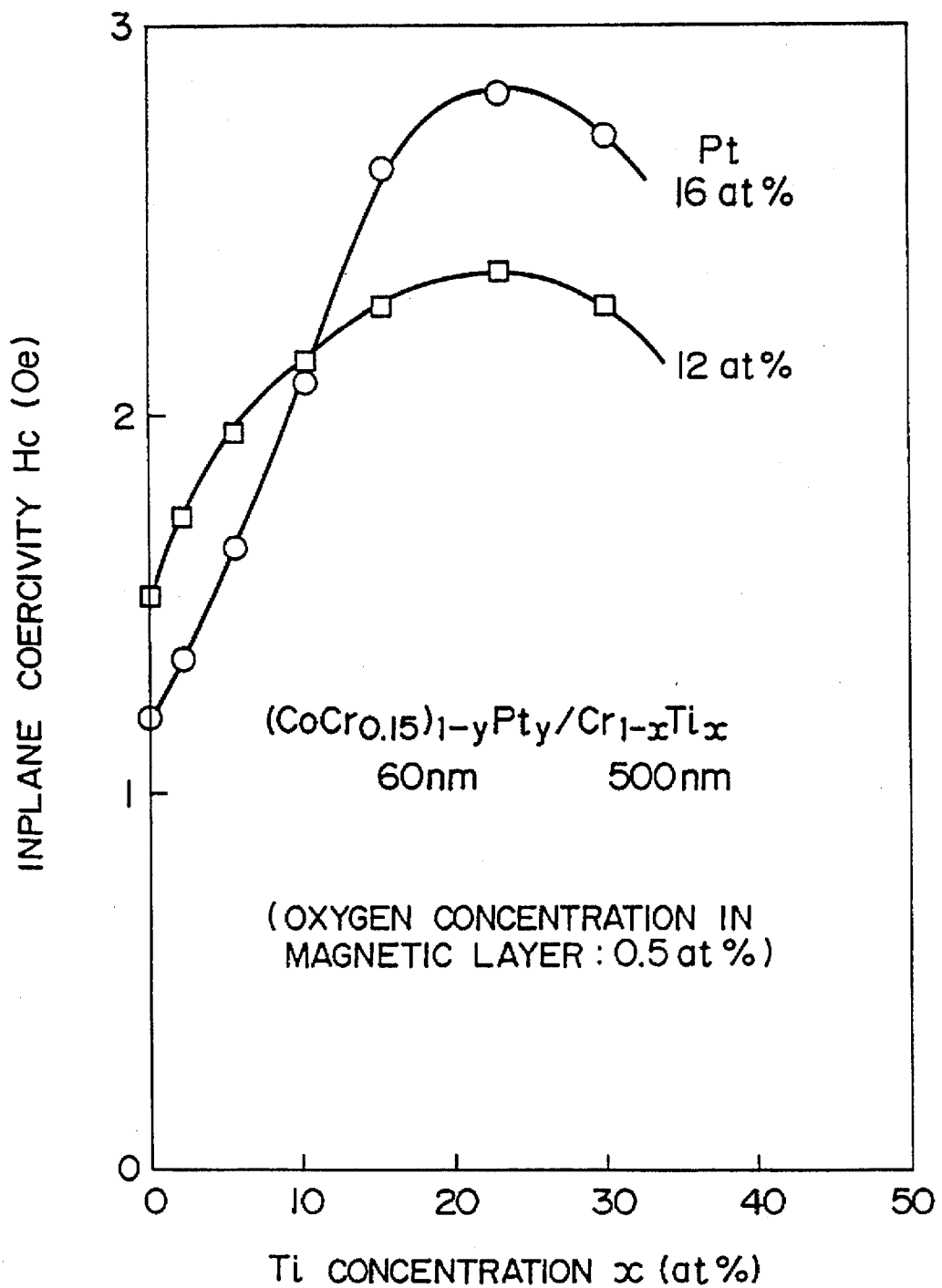
FIG. 15 is a diagram showing magnetic properties of magnetic recording media according to the present invention.

One embodiment of the present invention will be described below, referring to FIG. 1, where numeral 10 is a substrate of strengthened glass, plastics, Ni—P-plated Al alloy or the like; 11 and 11' are metallic underlayers of pure metal of Cr, Mo or W, or an alloy of Cr—Ti, Cr—Si, Cr—Mo, Cr—W or the like; 12 and 12' are magnetic layers of magnetic alloy comprising Co, a material composed of at least one element selected from the group consisting of Cr, Mo and W, a material composed of at least one element selected from the group consisting of Ti, Zr, Hf, Ta, Nb, Ru and Rh, and a material composed of at least one element selected from the group consisting of Al and Si; 13 and 13' are nonmagnetic protective layers composed of C, B, and S, or carbide, nitride, oxide or boride of Ti, Zr, Hf, Nb, Ta, V, Cr, Mo and W; and 14 and 14' are lubricant layers composed of perfluoroalkylpolyether, or the like.

The embodiment will be explained in detail below.

An Al—Mg alloy substrate, 89 mm in diameter, plated with Ni—P each to a thickness of 12 μm, was treated with abrasive grains, 2 μm is size, to give fine scars approximately in the circumferential direction on the substrate surface. The thus treated substrate with a surface roughness of 12 nm in the radial direction in terms of centerline average roughness was used as the substrate 10 for a magnetic disk. Then, Cr underlayers 11 and 11' were at first formed on both sides of the substrate 10 each to a thickness of 400 nm, then magnetic layers 12 and 12' of composition shown in Table 1 were formed on the Cr underlayers each to a thickness of 60 nm and finally carbon protective layers 13 and 13' are formed on the magnetic layers each to a thickness of 40 nm by DC magnetron sputtering at a substrate temperature of 100° C. under an Ar gas pressure of 15 mTorr with an input power density of 2 W/cm$^2$. Then, liquid lubricant layers 14 and 14' of perfluoroalkylpolyether were formed on the carbon protective layers each to a thickness of 6 nm to make a magnetic disk.

TABLE 1

|  |  | Magnetic layer | Media noise |
|---|---|---|---|
| Com- | 1 | $(Co_{0.9}Cr_{0.1})_{0.9}Ti_{0.05}Si_{0.05}$ | 5.6 µVrms |
| posi- | 2 | $(Co_{0.9}Cr_{0.1})_{0.9}Zr_{0.05}Si_{0.05}$ | 5.5 µVrms |
| tion | 3 | $(Co_{0.9}Cr_{0.1})_{0.9}Hf_{0.05}Si_{0.05}$ | 5.4 µVrms |
| No. | 4 | $(Co_{0.9}Cr_{0.1})_{0.9}Ta_{0.05}Si_{0.05}$ | 5.3 µVrms |
|  | 5 | $(Co_{0.9}Cr_{0.1})_{0.9}Nb_{0.05}Si_{0.05}$ | 5.2 µVrms |
|  | 6 | $(Co_{0.9}Cr_{0.1})0.93Ru_{0.02}Si_{0.05}$ | 5.7 µVrms |
|  | 7 | $(Co_{0.9}Cr_{0.1})_{0.93}Ru_{0.02}Si_{0.05}$ | 5.7 µVrms |
|  | 8 | $(Co_{0.87}Cr_{0.13})_{0.91}Ti_{0.05}Al_{0.04}$ | 5.5 µVrms |
|  | 9 | $(Co_{0.87}Cr_{0.13})_{0.91}Zr_{0.05}Al_{0.04}$ | 5.4 µVrms |
|  | 10 | $(Co_{0.87}Cr_{0.13})_{0.91}Hf_{0.05}Al_{0.04}$ | 5.3 µVrms |
|  | 11 | $(Co_{0.87}Cr_{0.13})_{0.91}Ta_{0.05}Al_{0.04}$ | 5.1 µVrms |
|  | 12 | $(Co_{0.87}Cr_{0.13})_{0.91}Nb_{0.05}Al_{0.04}$ | 5.0 µVrms |
|  | 13 | $(Co_{0.87}Cr_{0.13})_{0.93}Ru_{0.02}Al_{0.04}$ | 5.6 µVrms |
|  | 14 | $(Co_{0.87}Cr_{0.13})_{0.93}Rh_{0.02}Al_{0.04}$ | 5.7 µVrms |
| Comparative |  | $(Co_{0.9}Cr_{0.1})_{0.96}Ta_{0.04}$ | 8.5 µVrms |

The read and write characteristics of the thus obtained disks were evaluated as media noise at 7 MHz recording with a metal-in-gap (MIG) head having a gap length of 0.6 µm (Fe—Al—Si alloy used at the head tip end) at a head-to-media velocity of 15 m/sec. The media noise was found to be lower in all the compositions than that of comparative composition and thus a higher S/N ratio was obtained. The magnetic disks were placed in a magnetic disk apparatus to evaluate the corrosion resistance. Even if the apparatus was left standing in a high temperature/humidity atmosphere at 65° C. and 85% RH for 3 months, no generation of read and write error was observed at all in read and write tests at a high density of 50 Mb/in$^2$, which is a higher areal density than that on the conventional media. That is, a distinguished corrosion resistance was obtained.

Another embodiment of the present invention in the same structure as shown in FIG. 1 will be explained below.

On both sides of a strengthened glass substrate, 51 mm in diameter, whose surfaces were toughened to form fine irregularities approximately in the circumferential direction by chemical or physical etching or both, making a surface roughness of 10 nm in the radial direction in terms of centerline average roughness were formed Cr underlayers each to a thickness of 300 nm, magnetic layers of $(Co_{0.88}Cr_{0.12})_{0.90}Ta_{0.03}Si_{0.07}$ each to a thickness of 50 nm and ZrN protective layers each to a thickness of 25 nm in succession by sputtering at a substrate temperature of 150° C. in an Ar gas containing 0.05 to 0.5 vol. % of oxygen under an Ar gas pressure of 10 mTorr with an input power density of 5 W/cm$^2$. Finally, layers of perfluoroalkylpolyether-based lubricant containing end groups having an anchoring capacity were formed thereon each to a thickness of 4 nm to make a magnetic disk.

Analysis of oxygen concentration in the magnetic layers by Auger electron spectroscopy revealed that the magnetic layers contained 1 at. % to 8 at. % of oxygen. The thus obtained magnetic disks were subjected to read and write tests at a head-to-media velocity of 10 m/s and 5 MHz with the same magnetic head as used above and especially lower media noises of less than 4.5 µVrms were observed in all of the magnetic disks, and were found to be better than those When no oxygen was contained in the magnetic layers (5 µVrms). As to the corrosion resistance, a better result was obtained than that when no oxygen was contained in the magnetic layers. Similar results were also obtained in magnetic recording media with metallic underlayers of pure metal of Mo or W, or an alloy of Cr—Ti, Cr—Si or Cr—Mo.

With a thin film head or a metal-in-gap (MIG) head and 1 to 4 platters of the thus obtained magnetic disks, 89 mm in diameter or 51 mm in diameter, magnetic disk apparatuses of large capacity such as a higher recording density of 50 Mb/in$^2$ to 70 Mb/in$^2$ in terms of areal recording density than that of the conventional media could be made. When the capacity was the same as the conventional, the number of magnetic disks could be reduced or the size of the magnetic disks could be made smaller, so that the apparatus could be made smaller in size by at least 30%. At least two-fold corrosion resistance could be obtained in any of the present apparatuses, as compared with an apparatus using the conventional metallic longitudinal recording media. That is, the present magnetic disk apparatuses had remarkably distinguished capacity, reliability, etc., as compared with conventional magnetic disk apparatuses.

In the foregoing, magnetic disk apparatus have been explained, but the present invention is not limited thereto, but is also applicable to such magnetic recording application apparatuses such as magnetic tape apparatuses, magnetic floppy disk apparatuses, magnetic card apparatuses, magnetic image apparatuses, magnetic drum apparatuses, etc.

As explained above, the present invention can provide magnetic recording media with a high corrosion resistance, a smaller media noise and a higher S/N ratio at read and write runs particularly at a high recording density than those of the conventional metallic longitudinal recording media, and thus is particularly effective for a smaller size, a large capacity and a higher reliability of a magnetic memory apparatuses.

EXAMPLE 2

Further embodiment of the present invention will be explained below, referring also to FIG. 1, where numeral 10 is a substrate of strengthened glass, plastics, Ni—P-plated Al alloy or the like; 11 and 11' are nonmagnetic metallic underlayers of pure metal of Cr, Mo or W or alloy of Cr—Ti, Cr—Si, Cr—Mo, Cr—W or the like; 12 and 12' are magnetic layers of a magnetic alloy comprising Co and Pt, a material composed of at least one element selected from the group consisting of Ni, Cr, Mo and W, a material composed of at least one element selected from the group consisting of Ti, Zr, Hf, Ta, Nb, Ru and Rh, and a material composed of at least one element selected from the group consisting of Al and Si; 13 and 13' are nonmagnetic protective layers composed of C, B or Si or carbide, nitride, oxide or boride of Ti, Zr, Hf, Nb, Ta, V, Cr, Mo or W; and 14 and 14' are lubricating layers of perfluoroalkylpolyether or the like.

The embodiment will be explained in more detail below.

An Al—Mg alloy substrate, 130 nm in diameter, plated with Ni—P on both sides each to a thickness of 10 nm was treated with abrasive grains, 1 µm in size, to provide fine scans approximately in the circumferential direction on the surfaces, and thus the magnetic disk substrate having a surface roughness of 10 nm in the radial direction in terms of centerline average roughness was obtained.

On both surfaces of the substrate were formed Cr layers each to a thickness of 500 nm, then magnetic layers of magnetic alloy composition shown in Table 2 each to a thickness of 50 nm and a then C protective layers each to a thickness of 30 nm in succession by DC magnetron sputtering at a substrate temperature of 120° C. under an Ar gas pressure of 10 mTorr with an input power density of 1 W/cm$^2$. Finally, layers of perfluoroalkylpolyether-based liquid lubricant were formed thereon each to a thickness of 4 nm to make a magnetic disk.

TABLE 2

| | | Magnetic layer | Media noise $N_p$ |
|---|---|---|---|
| Composition No. | 1 | $(Co_{0.7}Ni_{0.3})_{0.85}Ti_{0.05}Si_{0.05}Pt_{0.05}$ | 4.4 µVrms |
| | 2 | $(Co_{0.7}Ni_{0.3})_{0.85}Zr_{0.05}Si_{0.05}Pt_{0.05}$ | 4.3 µVrms |
| | 3 | $(Co_{0.7}Ni_{0.3})_{0.85}Hf_{0.05}Si_{0.05}Pt_{0.05}$ | 4.2 µVrms |
| | 4 | $(Co_{0.7}Ni_{0.3})_{0.85}Ta_{0.05}Si_{0.05}Pt_{0.05}$ | 4.6 µVrms |
| | 5 | $(Co_{0.7}Ni_{0.3})_{0.85}Nb_{0.05}Si_{0.05}Pt_{0.05}$ | 4.7 µVrms |
| | 6 | $(Co_{0.7}Ni_{0.3})_{0.85}Ru_{0.05}Si_{0.05}Pt_{0.05}$ | 4.9 µVrms |
| | 7 | $(Co_{0.7}Ni_{0.3})_{0.85}Rh_{0.05}Si_{0.05}Pt_{0.05}$ | 5.0 µVrms |
| | 8 | $(Co_{0.88}Cr_{0.12})_{0.85}Ti_{0.05}Si_{0.05}Pt_{0.05}$ | 4.5 µVrms |
| | 9 | $(Co_{0.88}Ni_{0.12})_{0.85}Zr_{0.05}Al_{0.05}Pt_{0.05}$ | 4.3 µVrms |
| | 10 | $(Co_{0.88}Cr_{0.12})_{0.85}Hf_{0.05}Al_{0.05}Pt_{0.05}$ | 4.4 µVrms |
| | 11 | $(Co_{0.88}Cr_{0.12}O_{0.85}Ta_{0.05}Al_{0.05}Pt_{0.05}$ | 4.2 µVrms |
| | 12 | $(Co_{0.88}Cr_{0.12}O_{0.85}Nb_{0.05}Al_{0.05}Pt_{0.05}$ | 4.3 µVrms |
| | 13 | $(Co_{0.88}Cr_{0.12}O_{0.85}Ru_{0.05}Al_{0.05}Pt_{0.05}$ | 4.9 µVrms |
| | 14 | $(Co_{0.88}Cr_{0.12}O_{0.85}Rh_{0.05}Al_{0.05}Pt_{0.05}$ | 4.0 µVrms |
| | 15 | $(Co_{0.88}Mo_{0.12})_{0.85}Ta_{0.05}Si_{0.05}Pt_{0.05}$ | 4.0 µVrms |
| | 16 | $(Co_{0.88}W_{0.12})_{0.85}Ta_{0.05}Si_{0.05}Pt_{0.05}$ | 4.5 µVrms |
| | 17 | $(Co_{0.65}Ni_{0.30}Cr_{0.05})_{0.85}Zr_{0.05}Si_{0.05}Pt_{0.05}$ | 4.0 µVrms |
| | 18 | $(Co_{0.65}Ni_{0.30}Mo_{0.05})_{0.85}Zr_{0.05}Si_{0.05}Pt_{0.05}$ | 4.1 µVrms |
| | 19 | $(Co_{0.65}Ni_{0.30}W_{0.05})_{0.85}Zr_{0.05}Si_{0.05}Pt_{0.05}$ | 4.2 µVrms |
| | 20 | $(Co_{0.80}Ni_{0.10}Cr_{0.10})_{0.85}Ta_{0.05}Si_{0.05}Pt_{0.05}$ | 4.0 µVrms |
| Comparative | | $(Co_{0.7}Ni_{0.3})_{0.95}Zr_{0.05}$ | 7.0 µVrms |

The read and write characteristics of the thus obtained magnetic disks were evaluated as media noise at 9 MHz recording with a Mn—Zn ferrite ring head having a gap length of 0.7 µm at a head-to-media velocity of 20 m/s. The media noise was found to be not more than 5 µVrms in all the compositions, which were smaller than the head noise, amplifier noise or Comparative Case, and thus a higher S/N ratio was obtained, as compared with that of the conventional media. In a high temperature/humidity corrosion test of all of the media at 60° C. and 80% RH, no generation of read and write error was observed even after two weeks of the test, and a good corrosion resistance was obtained.

EXAMPLE 3

Still further embodiment of the present invention in the same structure as shown in FIG. 1 will be explained below.

On both sides of a strengthened glass substrate, 89 mm in diameter, whose surfaces were toughened to form fine irregularities approximately in the circumferential direction by chemical or physical etching or both, making a surface roughness of 15 nm in the radial direction in terms of centerline agerage roughness, were formed Cr underlayers each to a thickness of 350 nm, magnetic layers of $(Co_{0.6}Ni_{0.4})_{0.88}Zr_{0.04}Al_{0.04}Pt_{0.04}$ each to a thickness of 60 nm and protective layers of $ZrO_2$ each to a thickness 30 nm at a substrate temperature of 100° C. in an Ar gas containing 0.1 vol. % to 0.7 vol. % of oxygen under an Ar gas pressure of 15 mTorr with an input power density of 2 W/cm². Then, layers of perfluoroalkylpolyether-based lubricant containing end groups having an anchoring capacity were formed thereon each to a thickness of 5 nm to make a magnetic disk.

Analysis of oxygen concentration in the magnetic layers by Auger electron spectroscopy revealed that the magnetic layers contained 2 at. % to 10 at. % of oxygen. The thus obtained magnetic disks were subjected to read and write tests at a head-to-media velocity of 15 m/s and 7 MHz with the same magnetic head as used in Example 2 and especially lower media noises of less than 4 µVrms were observed in all of the magnetic disks and were found to be better than those when no oxygen was contained in the magnetic layers (4.5 Vrms). As to the corrosion resistance, a better result was obtained than that when no oxygen was contained in the magnetic layers.

Similar results were also obtained in magnetic recording media with metallic underlayers of pure metal of Mo or W, or an alloy of Cr—Si or Cr—Ti.

With a thin film head or metal-in-gap (MIG) head and 4 to 8 platters of the thus obtained magnetic disks, 89 mm in diameter or 130 mm in diameter, magnetic disk apparatuses of large memory capacity such as an areal recording density of 60 Mb/in² or more and an apparatus capacity of 200 MB or more were made. As compared with the apparatuses using the conventional metallic thin film media, approximately 2-fold corrosion resistance and better antiwear reliability were obtained and also the memory capacity, reliability, etc. were considerably improved.

When the present magnetic recording media were applied to magnetic disk apparatuses of equivalent areal recording density to the conventional one, the head-to-media spacing could be made lower than the conventional one and thus the antiwear reliability could be made higher at least twice. When the present magnetic recording media were used at a head-to-media spacing equal to or less than the conventional one, the areal recording density could be made higher at least twice, and thus the magnetic disk apparatuses could be made smaller in size and larger in capacity.

In the foregoing, explanation has been made mainly of magnetic disk apparatuses. The present invention is also applicable to any of apparatuses based on magnetic recording such as magnetic card apparatuses, magnetic image apparatuses, magnetic tape apparatuses, floppy disk apparatuses, magnetic drum apparatuses.

As explained above, the present invention provides magnetic recording media and magnetic memory apparatuses with a reduced media noise level at read and write runs at a high recording density by at least 1.5-fold, as compared with the conventional apparatuses and capable of reading and writing information of high density in a high S/N ratio and also with a good corrosion resistance of madia and higher performance and reliability. Thus, the present invention is effective for higher recording density and higher reliability particularly of magnetic memory apparatuses.

EXAMPLE 4

In FIG. 1 showing a cross-sectional view of a magnetic recording medium according to the present invention, numeral 11 is a nonmagnetic substrate of nonmagnetic Al alloy plated with Ni—P, Ni—P—W, or the like, or chemically strengthened glass or the like; 12 and 12' are nonmagnetic metallic underlayers of pure metal of body centered cubic (bcc) structure composed of at least one element selected from the group consisting of Cr, Mo, W, V, Nb and Ta, or an alloy containing these elements as main components, or the pure metal or alloy further containing at least one element selected from the group consisting of Ti, Si, Ge, Cu, Pt, Rh, Ru, Re, Pd and oxygen, formed on both sides of the substrate; 13 and 13' are magnetic layers of Co-based alloy comprising 1 to 35 at. % of at least one first additive element selected from the group consisting of Pt and Ir, 1 to 17 at. % of at least one second additive element selected from the group consisting of Ti, Zr, Hf, V, Nb, Ta, Cr, Mo, V, Ge and Si, except for Si, whose concentration is 1 to 40 at. %, and 0.1 to 10 at. % of oxygen, the balance being Co, formed on the underlayers, respectively; and 14 and 14' are protective layers comprising C, B, $B_4C$, Si—C, $Co_3O_4$, $SiO_2$, $Si_3N_4$, W—C, Zr—W—C, Zr—Nb—N, or the like, formed on the magnetic layers, respectively, and the foregoing magnetic recording medium was made in the following manner.

An aluminum alloy disk substrate containing 4 wt. % of magnesium, 130 mm in outer diameter, 40 mm in inner diameter and 1.9 mm in thickness, was plated with Ni-12 wt. % P each to a thickness of 20 μm on both sides of the substrate and further polished each to a thickness of 15 μm on both sides to have fine irregularities in the circumferential direction (head-moving direction) to make a centerline average roughness of 10 nm. The surface treatment (polishing) is usually called "texturing treatment". Then, the substrate was washed and then nonmagnetic metallic underlayers, magnetic layers and protective layers were formed in succession on both sides of the substrate by initial evacuation to $2 \times 10^{-6}$ Torr and then by RF magnetron sputtering in a discharge Ar gas atmoshere containing 0.2 vol. % of oxygen under an Ar gas pressure of 15 mTorr at a substrate temperature of 110° C. with an input power density of 1.6 W/cm$^2$ to make a magnetic recording medium for longitudinal recording. The nonmagnetic metallic layers were Cr layers containing 4 at. % of oxygen, the magnetic layers were composed of Co-15 at. % Cr-11 at. Pt alloy (containing 3 at. % of oxygen), and the protective layers were made of carbon. On the protective layers, lubricant layers of perfluoroalkylpolyether, or the like can be provided. When the thickness of Co-15 at. % Cr-11 at. % Pt was changed from 10 to 90 nm while keeping the thickness of Cr underlayers as the nonmagnetic metallic underlayers constant to 500 nm, static magnetic properties as shown in Table 3 were obtained.

TABLE 3

Static magnetic properties of C/Co—Cr—Pt/Cr layers

| Thickness of Co—Cr—Pt layer | Inplane coercivity (Hc) | Coercive squareness (S*) |
|---|---|---|
| 10 nm | 1560 Oe | 0.385 |
| 20 nm | 2250 Oe | 0.738 |
|  | (760) | (0.86) |
| 30 nm | 2415 Oe | 0.776 |
|  | (1120) | (0.88) |
| 45 nm | 1925 Oe | 0.769 |
|  | (1055) | (0.91) |
| 60 nm | 1820 Oe | 0.742 |
|  | (1070) | (0.92) |
| 75 nm | 2005 Oe | 0.789 |
|  | (960) | (0.92) |
| 90 nm | 1950 Oe | 0.826 |
|  | (900) | (0.92) |

In Table 3, numerical values in the parentheses show comparative values when no nonmagnetic metallic underlayers were provided. As is apparent from the comparative values, the presence of the nonmagnetic metallic underlayers play an important role in the improvement of magnetic properties, and such distinguished properties were obtained as an inplane coercivity Hc of more than 1,500 Oe while fully satisfying the condition of coercive squareness $S^* \leq 0.85$.

Even if the thickness of Cr layers as the nonmagnetic metallic underlayers was changed to 50, 100, 200, 300 and 400 nm, the coercive squareness S* was increased with increasing thickness of the magnetic layers, and was in a more preferable range of $0.85 \geq S^* \geq 0.6$, so long as the thickness of the magnetic layers was 15 nm or more. The coercive squareness S* is an average of values in the circumferential direction of disk, that is, the head moving direction and values in the radial direction, and the inplane coercivity Hc is a value in the circumferential direction of disk (these definitions will be applied to Examples and Comparative Examples which follow). Similar results were obtained with a surface toughened strengthened glass and an alumite-treated alloy disk substrate by a chemical etching treatment in place of NiP-plated Al alloy substrate.

COMPARATIVE EXAMPLE 1

A magnetic recording medium was prepared in the same manner as in Example 4 except that the alloy composition of the magnetic layers was changed to Co-20 at. % Ni-15 at. % Pt and the thickness of the magnetic layers was also changed to 90 nm, and it was found that the inplane coercivity Hc was 860 Oe. In spite of the presence of Cr layers as the same nonmagnetic metallic underlayers as in Example 4, the inplane coercivity Hc was largely lowered owing to a difference in the alloy composition of the magnetic layers. That is, Comparative Example 1 is a case where no second additive element of the present invention was contained.

EXAMPLE 5

Magnetic recording media were prepared in the same manner as in Example 4 except that a load-lock type DC magnetron sputtering apparatus was used as an apparatus for forming a magnetic recording medium for longitudinal recording, and Cr underlayers having a thickness of 400 nm and magnetic layers of composition shown in Table 5 having a thickness of 50 nm were formed in successive by initial evacuation to $1 \times 10^{-6}$ Torr and then by DC magnetron sputtering in a discharge A gas atmosphere containing 0.1 vol. % of oxygen under an Ar gas pressure of 10 mTorr at a substrate temperature of 150° C. with an input power density of 1.6 to 4.8 W/cm$^2$, and then protective layers were formed thereon under a discharge gas pressure of 3 mTorr. All of the magnetic layers and Cr underlayers contained 1 at. % of oxygen.

TABLE 5

Composition of magnetic layers

| Comp. No. | Magnetic layers |
|---|---|
| 201 | Co-15 at. % Cr-11 at. % Pt-1 at. % Si |
| 202 | Co-15 at. % Cr-3 at. % Ti-8 at. % Pt |
| 203 | Co-15 at. % Cr-3 at. % Zr-8 at. % Pt |
| 204 | Co-15 at. % Cr-3 at. % Hf-8 at. % Pt |
| 205 | Co 15 at. % Cr-3 at. % Ta-8 at. % Pt |
| 206 | Co-15 at. % Cr-3 at. % Nb-8 at. % Pt |
| 207 | Co-13 at. % Mo-13 at. % Pt |
| 208 | Co-13 at. % W-13 at. % Pt |
| 209 | Co-13 at. % V-13 at. % Pt |
| 210 | Co-20 at. % Si-2 at. % Ta-10 at. % Pt |
| 211 | Co-10 at. % Ge-2 at. % Ta-10 at. % Pt |
| 212 | Co-20 at. % Si-2 at. % Zr-10 at. % Pt |
| 213 | Co-10 at. % Ge-2 at. % Zr-10 at. % Pt |
| 214 | Co-20 at. % Si-2 at. % Nb-10 at. % Pt |
| 215 | Co-20 at. % Ge-2 at. % Nb-10 at. % Pt |
| 216 | Co-13 at. % Ti-13 at. % Pt |
| 217 | Co-13 at. % Zr-13 at. % Pt |
| 218 | Co-13 at. % Hf-13 at. % Pt |
| 219 | Co-13 at. % Nb-13 at. % Pt |
| 220 | Co-13 at. % Ta-13 at. % Pt |
| 221 | Co-10 at. % Mo-6 at. % Ti-10 at. % Pt |
| 222 | Co-10 at. % Cr-2.7 at. % Mo-10 at. % Pt |
| 223 | Co-17 at. % Cr-4 at. % Mo-5 at. % Ir |
| 224 | Co-13 at. % Cr-4 at. % Mo-20 at. % Pt |
| 225 | Co-3 at. % Cr-20 at. % Pt |
| 226 | Co-13 at. % Cr-12 at. % Pt-1 at. % Ir |

It was found that all of the magnetic recording media had an inplane coercivity of 1,400 Oe or more. Particularly when the inplane coercivity was 1,500 Oe or more, the linear recording density at −3 dB signal values was 35 kFCI or more irrespective of the compositions of the magnetic layers, and the signal-to-noise ratio (S/N) of these recording media was by about 20% higher than the S/N of the conventional media. However, even in the recording media with magnetic layers of alloy compositions formed in a discharge Ar gas atmosphere containing 0.1 vol. % of oxygen, which had an inplane coercivity of 1,500 Oe or more, the inplane coercivity was decreased to 1,200 Oe or less and a S/N ratio was lower, when the leak rate was large or the Ar gas atmosphere contained nitrogen, etc.

These media were subjected to NaCl spray test with a salt solution containing 0.001 mol/l of NaNO$_3$ and 0.1 Mol/l of NaCl to evaluate the corrosion resistance, and it was found that those having magnetic layers containing at least one element of Ti, Zr, Hf, Ta and Nb as the second additive element had a corrosion resistance at least twice as high as that of those having magnetic layers based on the other alloys. Particularly, in case of quaternary alloys shown in Compositions Nos. 201 to 206, 210 to 215, 221 and 223, highest linear recording density at −3 dB signal values, such as 40 kFCI or more were obtained together with particularly better overwrite characteristics and corrosion resistance.

These media were etched using an acid solution containing 0.6N of HCl and 0.07N of HNO$_3$, and the segregation structure was examined by TEM and SEM. The quaternary alloy disks with highest linear recording density had more remarkable segregation structure in the magnetic grains than ternary alloy disks.

Similar results were obtained with nonmagnetic metallic underlayers of pure metal of Mo, W, V, Nb, or Ta, or an alloy of Cr—Ti, Cr—W, Cr—Mo, Cr—Si, Cr—Pt, Mo—Ti, W—V, V—Si, Nb—Cr, or Ta—Cr. Particularly in case of underlayers of Cr-20 at. % Ti, Cr-20 at. % Si, Cr-1 at. % Pt and Mo-20 at. % Ti, highest S/N ratios were obtained. In any of these underlayers, there were no intermtallic compounds between Co and the elements of underlayer components.

EXAMPLE 6

An aluminum alloy disk, substrate containing 4 wt. % of magnesium, 130 mm in outer diameter, 40 nm in inner diameter and 1.9 mm in thickness, was plated with Ni-12 wt. % P each to a thickness of 20 μm on both sides of the substrate. Then, the substrate was polished each to a thickness of 15μ to give fine irregularities in the circumferential direction so that the centerline average roughness can be 5 nm. Then, the substrate was washed and nonmagnetic metallic underlayers, magnetic layers and protective layers were formed in succession on both sides of the substrate by initial evacuation to 2×10$^{-6}$ Torr and by RF magnetron sputtering in a discharge Ar gas atmosphere containing 0.5 vol. % of oxygen under a discharge Ar gas pressure of 15 mTorr at a substrate temperature of 100° C. with an input power density of 1.6 W/cm$^2$ to make a magnetic recording medium for longitudinal recording. The nonmagnetic metallic underlayers were composed of Cr, the magnetic layers were composed of an alloy of Co-8 at.Cr-3 at. % Ta-13 at. % Pt containing 6 at. % of oxygen, and the protective layers were composed of carbon. Lubricant layers of perfluoroalkylether can be provided on the protective layers.

When the thickness of the magnetic layers of Co-8 at. % Cr-3 at. % Ta-13 at. % Pt alloy containing 6 at. % of oxygen was changed from 10 to 90 nm while keeping the thickness of Cr layers as the nonmagnetic metallic underlayers constant to 500 nm, static magnetic properties as shown in Table 6 were obtained. Similar results were obtained when the thickness of Cr layers was changed to 100, 150, 200, 300, 400, 600 and 700 nm. However, when the thickness of Cr layers was 100 nm, the number of pin-on-disk test runs for the antiwear strength was less than 5,000, which was less than one-fourth of the strength in case of the thickness of Cr layers of 150 nm or more and thus the antiwear strength was very poor. When the thickness of Cr layers was 700 nm, the head-to-media spacing was not made less than 25 μm at the magnetic disk driving. On the other hand, when the thickness of Cr layers was 600 nm or less, the head-to-media spacing could be made as small as 0.1 μm and the reliability was considerably improved. Thus, a practically preferable thickness of Cr layers is 150 to 600 nm.

TABLE 6

| Static magnetic properties of C/Co—Cr—Ta—Pt/Cr layers | | |
|---|---|---|
| Thickness of Co—Cr—Pt layer | Inplane coercivity (Hc) | Coercive squareness (S*) |
| 10 nm | 1540 Oe | 0.510 |
| 20 nm | 2105 Oe | 0.752 |
| 30 nm | 2370 Oe | 0.784 |
| 45 nm | 1855 Oe | 0.778 |
| 60 nm | 1870 Oe | 0.802 |
| 75 nm | 1950 Oe | 0.765 |
| 90 nm | 1905 Oe | 0.782 |

EXAMPLE 7

Cr magnetic metallic underlayers having a thickness of 400 nm and magnetic layers of composition shown in Table 7 which had a thickness of 50 nm were formed in succession on the same substrate as used in Example 6 by initial evacuation to 1×10$^{-6}$ Torr and by load-lock type, DC magnetron sputtering in a discharge Ar gas atmosphere containing 0.05 vol. % of oxygen under an Ar gas pressure of 10 mTorr at a substrate temperature of 200° C. with an input power density of 1.6 to 4.8 W/cm$^2$ and then protective layers were formed under a discharge Ar gas pressure of 3 mTorr, where other conditions were the same as in Example 6.

All of the thus prepared magnetic recording media had an inplane coercivity of 1,500 Oe or more, the media having an inplane coercivity of 1,500 Oe or more had a linear recording density at −3 dB signal values of 35 kFCI or more, and the noise ratio (S/N) of these media was by about 20% higher than the S/N ratio of the conventional media having magnetic layers of Co—Ni alloy. Particularly, the magnetic disks of compositions Nos. 417 to 421 had particularly better overwrite characteristics and the leakage recording efficiency and erase efficiency in the track width direction were highest and the broadest margin for the position error was obtained. The magnetic disks of composition Nos. 417 to 421, 401 and 415 had more remarkable segregation structure at the magnetic grain boundaries and in the magnetic grains.

Then, the media were subjected to a NaCl spray test with a salt solution containing 0.001 mol/l of NaCO$_3$ and 0.1 mol/l of NaCl to evaluates the corrosion resistance. It was found that the media having magnetic layers containing Ti, Zr, Hf, Ta, V or Nb as the second additive element had an at least two-fold corrosion resistance, as compared with the media having magnetic layers containing Cr, Mo, W, Ce, Si, or the like. The same effect was obtained with nonmagnetic metallic underlayers of pure metal of Mo, W, V, Nb, or Ta, or an alloy of Cr—Ti, Cr—W, Cr—Mo, Mo—Ti, W—V, V—Si, Nb—Cr or Ta—Cr. The magnetic layers and the nonmagnetic metallic underlayers contained 0.5 at. % of oxygen.

TABLE 7

Composition of magnetic layers

| Comp. No. | Magnetic layers |
|---|---|
| 401 | Co-10 at. % Cr-15 at. % Pt |
| 402 | Co-3 at. % Cr-15 at. % Ir |
| 403 | Co-3 at. % Cr-3 at. % Ti-16 at. % Pt |
| 404 | Co-3 at. % Cr-3 at. % Zr-16 at. % Pt |
| 405 | Co-3 at. % Cr-3 at. % Hf-16 at. % Pt |
| 406 | Co-3 at. % Cr-3 at. % Ta-16 at. % Pt |
| 407 | Co-3 at. % Cr-3 at. % Nb-16 at. % Pt |
| 408 | Co-3 at. % Mo-22 at. % Pt |
| 409 | Co-5 at. % W-16 at. % Pt |
| 410 | Co-5 at. % V-16 at. % Pt |
| 411 | Co-5 at. % Mo-3 at. % Ti-16 at. % Pt |
| 412 | Co-6 at. % Cr-2 at. % Mo-16 at. % Pt |
| 413 | Co-5 at. % Cr-1.4 at. % Mo-16 at. % Pt |
| 414 | Co-3 at. % Cr-1 at. % Ir-14 at. % Pt |
| 415 | Co-10 at. % Cr-14 at. % Pt-1 at. % Ir |
| 416 | Co-3 at. % Cr-22 at. % Pt |
| 417 | Co-10 at. % Cr-8 at. % Pt |
| 418 | Co-10 at. % Mo-8 at. % Pt |
| 419 | Co-10 at. % W-8 at. % Pt |
| 420 | Co-15 at. % Si-8 at. % Pt |
| 421 | Co-10 at. % Ge-8 at. % Pt |

EXAMPLE 8

Cr-20 at. % Ti metallic underlayers having a thickness of 400 nm and magnetic layers of composition shown in Table 8, which had a thickness of 50 nm were formed on the same substrate as used in Example 6 by initial evacuation to $1 \times 10^{-6}$ Torr and load-lock type, DC magnetic sputtering in a discharge Ar gas atmosphere containing 0.05 vol. % of oxygen under a discharge Ar gas pressure of 10 mTorr at a substrate temperature of 250° C. and the protective layers were formed under a discharge Ar gas pressure of 3 mTorr, where other conditions were the same as in Example 6.

All of the thus obtained magnetic recording media had an inplane coercity of 1,200 Oe or more. Particularly when the inplane coercivity of the media was 1,200 Oe or more, the linear recording density at −3 dB signal values was 33 kFCl or more and the noise ratio (S/N) of these media was by about 15% higher than the S/N ratio of the conventional media having magnetic layers of Co—Ni alloy or Co—Cr alloy. The magnetic layers and the nonmagnetic metallic underlayers contained 0.2 at. % of oxygen. The magnetic layers had a segregation structure at the gain boundaries and in the grains.

TABLE 8

Composition of magnetic layers

| Comp. No. | Magnetic layers |
|---|---|
| 501 | Co-10 at. % Cr-2.5 at. % Pt |
| 502 | Co-12 at. % Cr-2.5 at. % Pt |
| 503 | Co-14 at. % Cr-2.5 at. % Pt |
| 504 | Co-16 at. % Cr-2.5 at. % Pt |
| 505 | Co-9 at. % Cr-1.5 at. % Pt |
| 506 | Co-11 at. % Cr-1.5 at. % Pt |
| 507 | Co-13 at. % Cr-1.5 at. % Pt |
| 508 | Co-15 at. % Cr-1.5 at. % Pt |
| 509 | Co-15 at. % Si-2.5 at. % Pt |
| 510 | Co-10 at. % Ge-2.5 at. % Pt |

EXAMPLE 9

With 1 to 9 platters of magnetic recording media prepared in Examples 4 to 8 and a metal-in-gap (MIG) type or thin film type magnetic heads using Fe—Al—Si—Ru film having a thickness of 2 μm or Co—Nb—Zr film having a thickness of 20 μm as magnetic pole tips, magnetic disk apparatuses were made. The resulting magnetic disk apparatuses had a larger capacity, for example, by at least 1.5-fold, than the capacity of magnetic disk apparatuses using the conventional coating media or longitudinal media of Co—Ni alloy, and also had a higher reliability in the antiwear properties, the corrosion resistance, etc. by at least 2-fold.

EXAMPLE 10

In a conventional magnetic memory apparatus comprising a magnetic recording medium, a driving means for turning the magnetic recording medium, a magnetic head, a head access means, and a read and write means for the magnetic head, any one of the magnetic recording medium shown in Examples 4 to 8 was used as the magnetic recording medium and a thin film type magnetic head whose magnetic pole was composed of Ni—Fe or Co—Ta—Zr was used.

The present invention can provide magnetic recording media capable of reading and writing information at a high recording density and having disting reliabilities in the corrosion resistance, flyability and antiwear properties and also a magnetic memory apparatus of high capacity.

What is claimed is:

1. A magnetic recording medium for longitudinal recording, which comprises a nonmagnetic substrate and a magnetic layer provided on the nonmagnetic substrate, the magnetic layer being crystalline and composed mainly of an alloy comprising Co, and simultaneously a material X composed of at least one element selected from a first group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si, wherein the magnetic layer contains 0.1 at % to 15 at % of oxygen.

2. A magnetic recording medium for longitudinal recording according to claim 1, wherein an intermediate layer comprising a material composed of at least one element selected from the group consisting of Cr, Mo and W is provided between the magnetic layer and the nonmagnetic substrate.

3. A magnetic recording medium for longitudinal recording, which comprises a nonmagnetic substrate and a magnetic layer provided on the nonmagnetic substrate, the magnetic layer being crystalline and composed mainly of an alloy comprising Co, and simultaneously a material X composed of at least one element selected from a first group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si, the composition of the magnetic layer being represented by the following general formula:

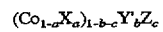

$$(Co_{1-a}X_a)_{1-b-c}Y'_bZ_c$$

wherein $0.03 \leq a \leq 0.20$, $0.01 \leq b \leq 0.15$ and $0.01 \leq c \leq 0.15$, and wherein the magnetic layer contains 0.1 at % to 15 at % of oxygen.

4. A magnetic recording medium for longitudinal recording according to claim 3, wherein an intermediate layer comprising a material composed of at least one element selected from the group consisting of Cr, Mo and W is provided between the magnetic layer and the nonmagnetic substrate.

5. A magnetic recording medium for longitudinal recording which comprises a nonmagnetic substrate and a magnetic layer provided on the nonmagnetic substrate, the magnetic layer being crystalline and composed mainly of an alloy comprising Co, Pt, and simultaneously Ni, a material Y' composed of at least one element selected from the group consisting of Ti, Zr, Hf, Ta, Nb, Ru and Rh, and a material Z composed of at least one element selected from a third group consisting of Al and Si, wherein the composition of the magnetic layer is represented by the following general formula:

$$(Co_{1-a}Ni_a)_{1-b-c-d}Y'_b Z_c Pt_d$$

wherein $0.1 \leq a \leq 0.5$, $0.01 \leq b \leq 0.15$ and $0.01 \leq c \leq 0.15$ and $0.001 \leq d \leq 0.20$.

6. A magnetic recording medium for longitudinal recording according to claim 5, wherein the magnetic layer contains 0.1 at % to 15 at % of oxygen.

7. A magnetic recording medium for longitudinal recording according to claim 6, wherein an intermediate layer comprising a material composed of at least one element selected from the group consisting of Cr, Mo and W is provided between the magnetic layer and the nonmagnetic substrate.

8. A magnetic recording medium for longitudinal recording which comprises a nonmagnetic substrate and a magnetic layer provided on the nonmagnetic substrate, the magnetic layer being crystalline and composed mainly of an alloy comprising Co, Pt, and simultaneously a material X' composed of at least one element selected from the group consisting of Ni, Cr, Mo and W, a material Y' composed of at least one element selected from the group consisting of Ti, Zr, Hf, Ta, Nb, Ru and Rh, and a material Z composed of at least one element selected from a third group consisting of Al and Si, Wherein when X' is a material composed of at least one element selected from the group consisting of Cr, Mo and W, the composition of the magnetic layer is represented by the following general formula:

$$(Co_{1-a-e}Ni_a X'_e)_{1-b-c-d}Y'_b Z_c Pt_d$$

wherein
$0.1 \leq a \leq 0.5$, $0.01 \leq e \leq 0.15$,
$0.01 \leq b \leq 0.15$, $0.001 \leq c \leq 0.15$ and
$0.01 \leq d \leq 0.20$.

9. A magnetic recording medium for longitudinal recording according to claim 8, wherein the magnetic layer contains 0.1 at % to 15 at % of oxygen.

10. A magnetic recording medium for longitudinal recording which comprises a nonmagnetic substrate and a magnetic layer provided on the nonmagnetic substrate, the magnetic layer being crystalline and composed mainly of an alloy comprising Co, Pt, and simultaneously a material X' composed of at least one element selected from the group consisting of Ni, Cr, Mo and W, a material Y' composed of at least one element selected from the group consisting of Ti, Zr, Hf, Ta, Nb, Ru and Rh, and a material Z composed of at least one element selected from a third group consisting of Al and Si, wherein the magnetic layer contains 0.1 at % to 15 at % of oxygen.

11. A magnetic recording medium for longitudinal recording according to claim 10, wherein an intermediate layer comprising a material composed of at least one element selected from the group consisting of Cr, Mo and W is provided between the magnetic layer and the nonmagnetic substrate.

12. A magnetic memory apparatus which comprises at least a magnetic recording medium, a driving means for turning the magnetic recording medium, at least a magnetic head for reading and writing to and from the magnetic recording medium, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording, which comprises a nonmagnetic substrate and a crystalline magnetic layer provided on the nonmagnetic substrate, the crystalline magnetic layer containing 0.1 at % to 15 at % of oxygen and being composed mainly of an alloy comprising Co, and simultaneously a material X composed of at least one element selected from a first group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si.

13. A magnetic memory apparatus according to claim 12, wherein an intermediate layer comprising a material composed of at least one element selected from the group consisting of Cr, Mo and W is provided between the magnetic layer and the nonmagnetic substrate.

14. A magnetic memory apparatus, which comprises at least a magnetic recording medium, a driving means for turning the magnetic recording medium, at least a magnetic head for reading and writing to and from the magnetic recording medium, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording, which comprises a nonmagnetic substrate and a crystalline magnetic layer provided on the nonmagnetic substrate, the crystalline magnetic layer being composed mainly of an alloy comprising Co, and simultaneously a material X composed of at least one element selected from a first group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si according to the following general formula:

$$(Co_{1-a}X_a)_{1-b-c}Y'_b Z_c$$

wherein $0.03 \leq a \leq 0.20$, $0.01 \leq b \leq 0.15$, and $0.01 \leq c \leq 0.15$, the magnetic layer containing 0.1 at % to 15 at % of oxygen.

15. A magnetic memory apparatus according to claim 14, wherein an intermediate layer comprising a material composed of at least one element selected from the group consisting of Cr, Mo and W is provided between the magnetic layer and the nonmagnetic substrate.

16. A magnetic memory apparatus which comprises at least a magnetic recording medium, a driving means for turning the magnetic recording medium, at least a magnetic head for reading and writing to and from the magnetic recording medium, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording which comprises a nonmagnetic substrate and a crystalline magnetic layer provided on the nonmagnetic substrate, the composition of the magnetic layer represented by the following general formula:

$(Co_{1-a}Ni_a)_{1-b-c-d}Y'_bZ_cPt_d,$ wherein $0.1 \leq a \leq 0.5$, $0.01 \leq b \leq 0.15$, $0.01 \leq c \leq 0.15$ and $0.001 \leq d \leq 0.20$, and wherein Y' is composed of at least one element selected from the group consisting of Ti, Zr, Hf, Ta, Nb, Ru and Rh, and a material Z is composed of at least one element selected from the group consisting of Al and Si.

17. A magnetic memory apparatus according to claim 16, wherein the magnetic layer contains 0.1 at % to 15 at % of oxygen.

18. A magnetic memory apparatus according to claim 17, wherein an intermediate layer comprising a material composed of at least one element selected from the group consisting of Cr, Mo and W is provided between the magnetic layer and the nonmagnetic substrate.

19. A magnetic memory apparatus which comprises at least a magnetic recording medium, a driving means for turning the magnetic recording medium, at least a magnetic head for reading and writing to and from the magnetic recording medium, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording which comprises a nonmagnetic substrate and a crystalline magnetic layer provided on the nonmagnetic substrate, the magnetic layer being composed mainly of an alloy comprising Co, Pt, a material X' composed of at least one element selected from the group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si, the composition of the magnetic layer is represented by the following general formula:

$$(Co_{1-a-e}Ni_aX'_e)_{1-b-c-d}Y'_bZ_cPt_d,$$

wherein $0.1 \leq a \leq 0.5$, $0.01 \leq e \leq 0.15$, $0.01 \leq b \leq 0.15$, $0.001 \leq c \leq 0.15$ and $0.01 \leq d \leq 0.20$.

20. A magnetic memory apparatus according to claim 19, wherein the magnetic layer contains 0.1 at % to 15 at % of oxygen.

21. A magnetic memory apparatus which comprises at least a magnetic recording medium, a driving means for turning the magnetic recording medium, at least a magnetic head for reading and writing to and from the magnetic recording medium, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording which comprises a nonmagnetic substrate and a crystalline magnetic layer provided on the nonmagnetic substrate, the magnetic layer being composed mainly of an alloy comprising Co, Pt, a material X' composed of at least one element selected from a first group consisting of Ni, Cr, Mo and W, a material Y' composed of at least one element selected from a second group consisting of Ti, Zr, Hf, Ta, Nb, Ru and Rh, and a material Z composed of at least one element selected from a third group consisting of Al and Si, wherein the magnetic layer contains 0.1 at % to 15 at % of oxygen.

22. A magnetic memory apparatus according to claim 21, wherein an intermediate layer comprising a material composed of at least one element selected from the group consisting of Cr, Mo and W is provided between the magnetic layer and the nonmagnetic substrate.

23. A magnetic recording medium for longitudinal recording which comprises a nonmagnetic substrate and a magnetic layer provided on the nonmagnetic substrate, the magnetic layer being crystalline and composed mainly of an alloy comprising Co, Pt, and simultaneously a material X' composed of at least one element selected from the group consisting of Ni, Cr, Mo and W, a material Y' composed of at least one element selected from the group consisting of Ti, Zr, Hf, Ta, Nb, Ru and Rh, and a material Z composed of at least one element selected from the group consisting of Al and Si, wherein X' is a material composed of at least one element selected from the group consisting of Cr, Mo and W, the composition of the magnetic layer being represented by the following general formula:

$$(Co_{1-a'}X'_{a'})_{1-b-c-d}Y'_bZ_cPt_d,$$

wherein $0.03 \leq a' \leq 0.20$, $0.01 \leq b \leq 0.15$, $0.01 \leq c \leq 0.15$, and $0.001 \leq d \leq 0.20$, and wherein the magnetic layer contains 0.1 at % to 15 at % of oxygen.

24. A magnetic memory apparatus which comprises at least a magnetic recording medium, a driving means for turning the magnetic recording medium, at least a magnetic head for reading and writing to and from the magnetic recording medium, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording which comprises a nonmagnetic substrate and a crystalline magnetic layer provided on the nonmagnetic substrate, the magnetic layer containing 0.1 at % to 15 at % of oxygen and being composed mainly of an alloy comprising Co, Pt, a material X' composed of at least one element selected from a first group consisting of Ni, Cr, Mo and W, a material Y' composed of at least one element selected from a second group consisting of Ti, Zr, Hf, Ta, Nb, Ru and Rh, and a material Z composed of at least one element selected from a third group consisting of Al and Si, the composition of the magnetic layer represented by the following general formula:

$$(Co_{1-a'}X'_{a'})_{1-b-c-d}Y'_bZ_cPt_d,$$

wherein $0.03 \leq a \leq 0.20$, $0.01 \leq b \leq 0.15$, $0.01 \leq c \leq 0.15$, and $0.001 \leq d \leq 0.20$.

25. A magnetic memory apparatus which comprises at least a magnetic recording medium, a driving means for turning the magnetic recording medium, at least a magnetic head for reading and writing to and from the magnetic recording medium and having a magnetic pole, at least a part of which is made of a ferromagnetic metal, a magnetic head access system for positioning said magnetic head with respect to said magnetic recording medium, and a read and write system operatively connected with the magnetic head, wherein the magnetic recording medium is a magnetic recording medium for longitudinal recording, which comprises a nonmagnetic substrate and a crystalline magnetic layer provided on the nonmagnetic substrate, the magnetic layer being composed mainly of an alloy comprising Co, and simultaneously a material X' composed of at least one element selected from a first group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si, wherein the magnetic layer contains 0.1 at % to 15 at % of oxygen.

26. A magnetic memory apparatus according to claim 25, wherein an intermediate layer comprising a material composed of at least one element selected from the group consisting of Cr, Mo and W is provided between the magnetic layer and the nonmagnetic substrate.

27. A magnetic memory apparatus, which comprises at least a magnetic recording medium, a driving means for turning the magnetic recording medium, at least a magnetic head for reading and writing to and from the magnetic recording medium and having a magnetic pole, at least a part of which is made of a ferromagnetic metal, a magnetic head access system for positioning said magnetic head with respect to said magnetic recording medium, and a read and write system operatively connected with the magnetic head, wherein the magnetic recording medium is a magnetic recording medium for longitudinal recording, which comprises a nonmagnetic substrate and a crystalline magnetic layer provided on the nonmagnetic substrate, the magnetic layer containing 0.1 at % to 15 at % of oxygen and being composed mainly of an alloy comprising Co, and simultaneously a material X' composed of at least one element selected from a first group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si, wherein the composition of the magnetic layer is represented by the following general formula:

$$(Co_{1-a}X_a)_{1-b-c}Y_bZ_c$$

wherein $0.03 \leq a \leq 0.20$, $0.01 \leq b \leq 0.15$, and
$0.01 \leq c \leq 0.15$.

28. A magnetic memory apparatus according to claim 27, wherein an intermediate layer comprising a material composed of at least one element selected from the group consisting of Cr, Mo and W is provided between the magnetic layer and the nonmagnetic substrate.

29. A magnetic memory apparatus which comprises at least a magnetic recording medium, a driving means for turning the magnetic recording medium, at least a magnetic head having a magnetic pole at least a part of which is made of a ferromagnetic metal for reading and writing to and from the magnetic recording medium, a magnetic head access system for positioning said magnetic head with respect to said magnetic recording medium and operatively connected with the magnetic head, and a read and write signal processing system operatively connected with the magnetic head, wherein the magnetic recording medium is a magnetic medium for longitudinal recording and comprises a nonmagnetic substrate and a crystalline magnetic layer provided on the nonmagnetic substrate, the magnetic layer being composed mainly of an alloy comprising Co, Pt, Ni and simultaneously a material Y' composed of at least one element selected from the group consisting of Ti, Zr, Hf, Ta, Nb, Ru and Rh, and a material Z composed of at least one element selected from the group consisting of Al and Si, the composition of the magnetic layer represented by the following general formula:

$$(Co_{1-a}Ni_a)_{1-b-c-d}Y_bZ_cPt_d$$

wherein $0.1 \leq a \leq 0.5$, $0.01 \leq b \leq 0.15$, $0.01 \leq c \leq 0.15$, and
$0.001 \leq d \leq 0.20$.

30. A magnetic memory apparatus according to claim 29, wherein the magnetic layer contains 0.1 at % to 15 at % of oxygen.

31. A magnetic memory apparatus according to claim 30, wherein an intermediate layer comprising a material composed of at least one element selected from the group consisting of Cr, Mo and W is provided between the magnetic layer and the nonmagnetic substrate.

32. A magnetic memory apparatus which comprises at least a magnetic recording medium, a driving means for turning the magnetic recording medium, at least a magnetic head having a magnetic pole at least a part of which is made of a ferromagnetic metal for reading and writing to and from the magnetic recording medium, a magnetic head access system for positioning said magnetic head with respect to said magnetic recording medium and operatively connected with the magnetic head, and a read and write signal processing system operatively connected with the magnetic head, wherein the magnetic recording medium is a magnetic medium for longitudinal recording and comprises a nonmagnetic substrate and a crystalline magnetic layer provided on the nonmagnetic substrate, the magnetic layer being composed mainly of an alloy comprising Co, Pt, and simultaneously a material X' composed of at least one element selected from a first group consisting of Ni, Cr, Mo and W, a material Y' composed of at least one element selected from a second group consisting of Ti, Zr, Hf, Ta, Nb, Ru and Rh, and a material Z composed of at least one element selected from a third group consisting of Al and Si, wherein when X' is a material composed of at least one element selected from the group consisting of Cr, Mo and W, the composition of the magnetic layer is represented by the following general formula:

$$(Co_{1-a-e}Ni_aX_e)_{1-b-c-d}Y_bZ_cPt_d$$

wherein $0.1 \leq a \leq 0.5$, $0.01 \leq e \leq 0.15$,
$0.01 \leq b \leq 0.15$, $0.001 \leq c \leq 0.15$ and
$0.01 \leq d \leq 0.20$.

33. A magnetic memory apparatus according to claim 32, wherein the magnetic layer contains 0.1 at % to 15 at % of oxygen.

34. A magnetic memory apparatus which comprises at least a magnetic recording medium, a driving means for turning the magnetic recording medium, at least a magnetic head having a magnetic pole at least a part of which is made of a ferromagnetic metal for reading and writing to and from the magnetic recording medium, a magnetic head access system for positioning said magnetic head with respect to said magnetic recording medium and operatively connected with the magnetic head, and a read and write signal processing system operatively connected with the magnetic head, wherein the magnetic recording medium is a magnetic medium for longitudinal recording and comprises a nonmagnetic substrate and a crystalline magnetic layer provided on the nonmagnetic substrate, the magnetic layer being composed mainly of an alloy comprising Co, Pt, and simultaneously a material X' composed of at least one element selected from a first group consisting of Ni, Cr, Mo and W, a material Y' composed of at least one element selected from a second group consisting of Ti, Zr, Hf, Ta, Nb, Ru and Rh, and a material Z composed of at least one element selected from a third group consisting of Al and Si, wherein the magnetic layer contains 0.1 at % to 15 at % of oxygen.

35. A magnetic memory apparatus according to claim 34, wherein an intermediate layer comprising a material composed of at least one element selected from the group consisting of Cr, Mo and W is provided between the magnetic layer and the nonmagnetic substrate.

36. A magnetic memory apparatus which comprises at least a magnetic recording medium, a driving means for turning the magnetic recording medium, at least a magnetic head having a magnetic pole at least a part of which is made of a ferromagnetic metal for reading and writing to and from the magnetic recording medium, a magnetic head access system for positioning said magnetic head with respect to said magnetic recording medium and operatively connected with the magnetic head, and a read and write signal processing system operatively connected with the magnetic head, wherein the magnetic recording medium is a magnetic medium for longitudinal recording and comprises a nonmagnetic substrate and a crystalline magnetic layer provided on the nonmagnetic substrate, the magnetic layer being composed mainly of an alloy comprising Co, Pt, and simultaneously a material X' composed of at least one element selected from a first group consisting of Cr, Mo and W, a material Y' composed of at least one element selected from a second group consisting of Ti, Zr, Hf, Ta, Nb, Ru and Rh, and a material Z composed of at least one element selected from a third group consisting of Al and Si, the composition of the magnetic layer represented by the following general formula:

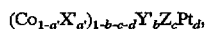

$(Co_{1-a'}X'_{a'})_{1-b-c-d}Y'_b Z_c Pt_d$, wherein $0.03 \leq a' \leq 0.20$, $0.01 \leq b \leq 0.15$, $0.01 \leq c \leq 0.15$, $0.001 \leq d \leq 0.20$, and wherein the magnetic layer contains 0.1 at % to 15 at % of oxygen.

37. A magnetic memory apparatus which comprises at least a magnetic recording medium, a driving means for turning the magnetic recording medium, at least a magnetic head for reading and writing to and from the magnetic recording medium and at least a portion of magnetic pole is made of a ferromagnetic metal, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording which comprises a nonmagnetic substrate, a nonmagnetic metallic underlayer comprising at least one metal element selected from the group consisting of Cr, Mo, W, V, Nb and Ta, formed on the nonmagnetic substrate, and a magnetic layer of Co-based alloy, formed on the nonmagnetic metallic underlayer, the magnetic layer comprising at least one first additive element selected from a group consisting of Pt and Ir, at least one second additive element selected from the group consisting of Ti, Zr, Hf, V, Nb, Ta, Cr, Mo, W, Ge and Si, and oxygen.

38. A magnetic memory apparatus according to claim 37 wherein the content of the first additive element is 1 to 35 at %, the content of the second additive element is 1 to 17 at %, and the content of oxygen is 0.1 to 10 at %, a sum total of the contents of the first and second additive elements and the oxygen being 2.2 to 50 at %.

39. A magnetic memory apparatus according to claim 37, wherein the second additive element comprises at least one element selected from the group consisting of Cr, Mo, W, Ge and Si and at least one element selected from a group B consisting of Ti, Zr, Hf, V, Nb and Ta.

40. A magnetic memory apparatus according to claim 37, wherein the second additive element comprises at least one element selected from the group consisting of Cr, Mo, W, Ge and Si.

41. A magnetic memory apparatus according to claim 37, wherein the magnetic layer of Co-based alloy has an inplane coercivity of at least 1,200 Oe and a coercive squareness S* of not more than 0.85.

42. A magnetic memory apparatus according to claim 37, wherein said magnetic memory apparatus comprises a plurality of heads.

43. A magnetic memory apparatus according to claim 42, wherein said magnetic memory apparatus comprises a plurality of magnetic recording media.

44. A magnetic memory apparatus, comprising at least a magnetic recording medium, a driving means for turning the magnetic recording medium, a magnetic head for reading and writing to and from the magnetic recording medium and at least a portion of magnetic pole is made of a ferromagnetic metal, a magnetic head access system in operative connection with the magnetic head for positioning said magnetic head with respect to said magnetic recording medium, and a read and write system operatively connected with the magnetic head, wherein the magnetic recording medium is a magnetic recording medium for longitudinal recording which comprises a nonmagnetic substrate, a nonmagnetic metallic underlayer comprising at least one metal element selected from the group consisting of Cr, Mo, W, V, Nb and Ta, formed on the nonmagnetic substrate, and a magnetic layer of Co-based alloy, formed on the nonmagnetic metallic underlayer, the magnetic layer comprising at least one first additive element, at least one second additive element, and oxygen, wherein the first additive element is Pt, and the second additive element is Cr and Si.

* * * * *